June 28, 1949. W. F. SMITH 2,474,285
BANK STRIP WELDING MACHINE
Filed Feb. 11, 1947 24 Sheets-Sheet 1

INVENTOR.
WILLIAM F. SMITH
BY
ATTORNEY

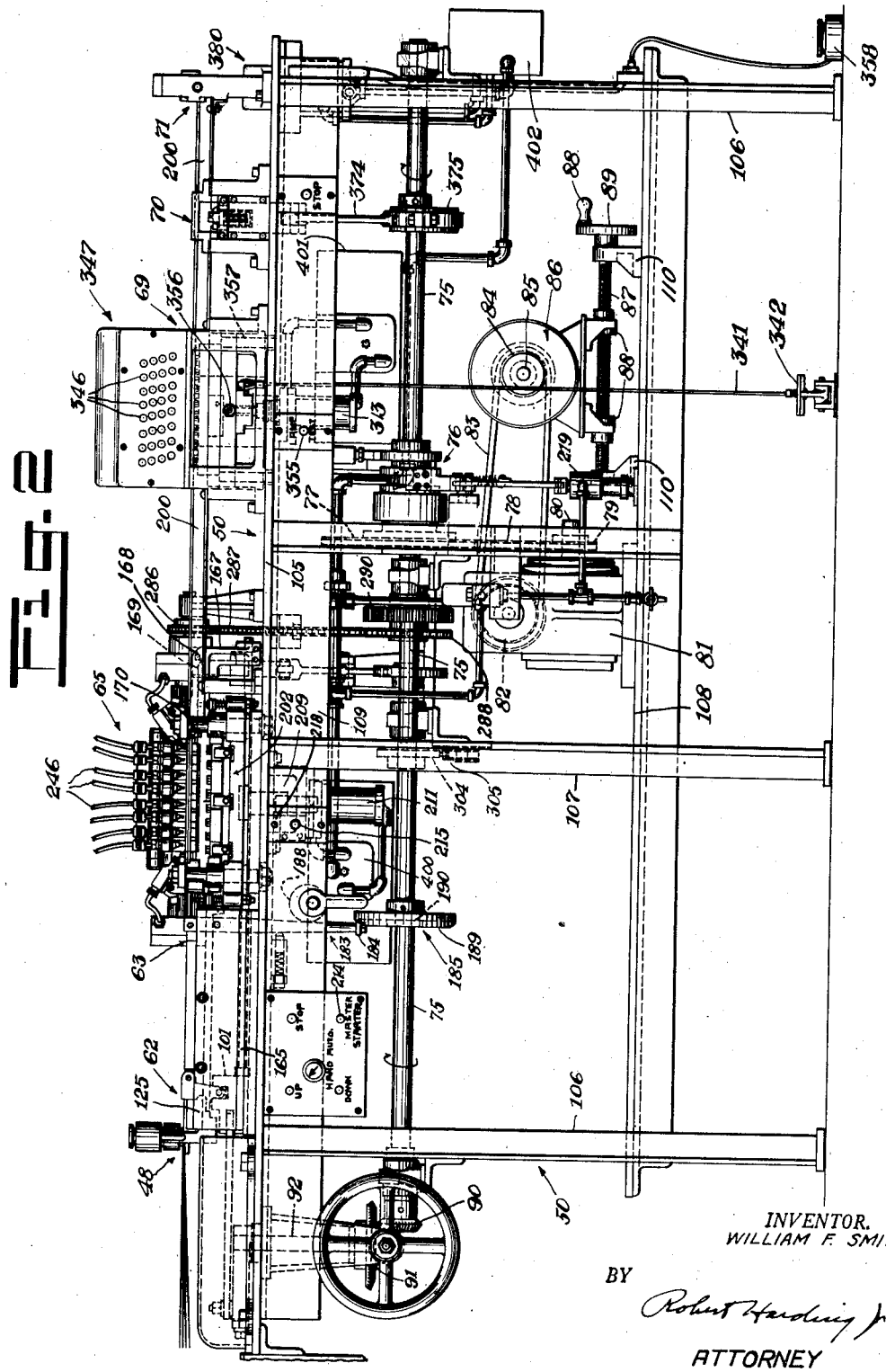

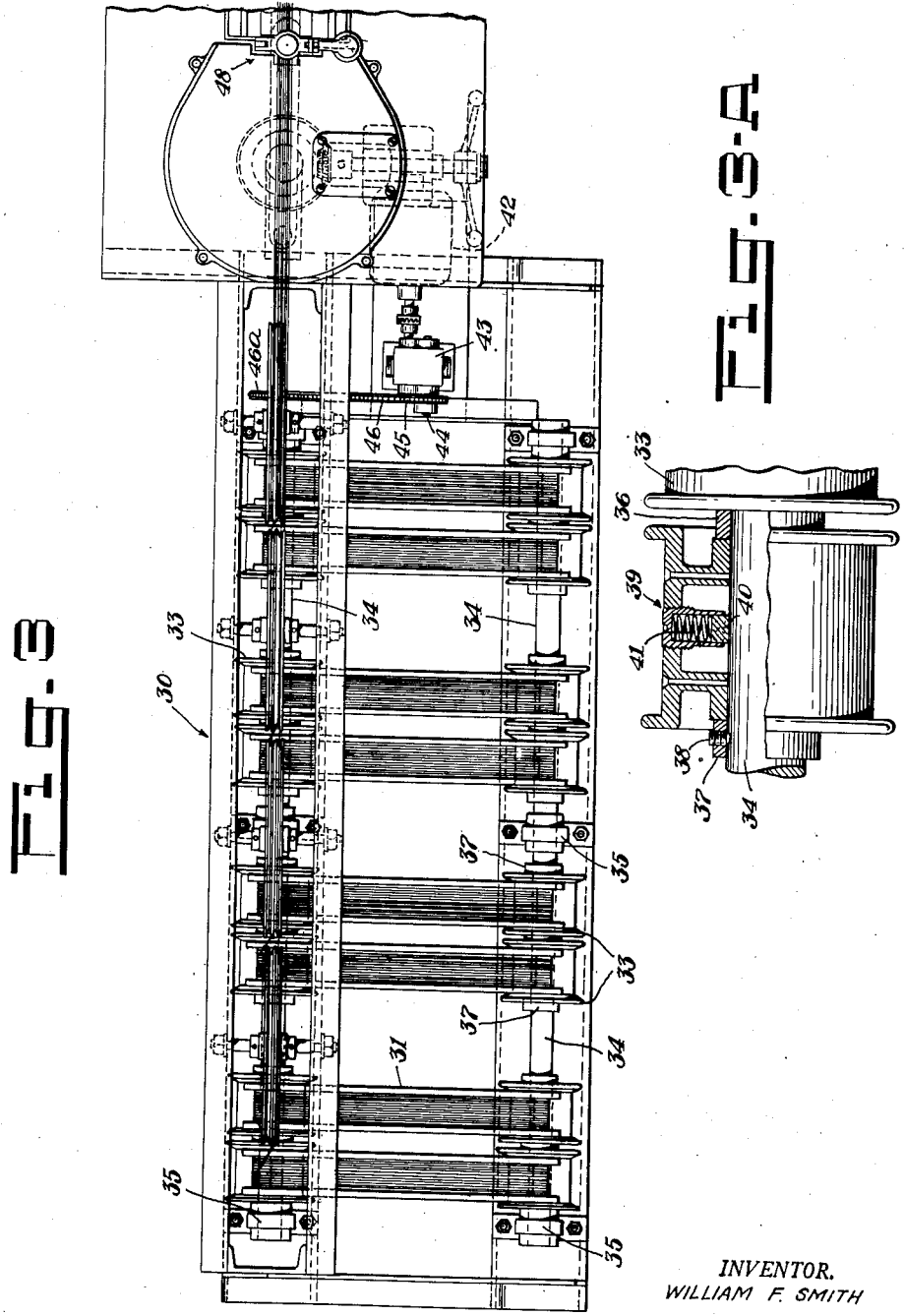

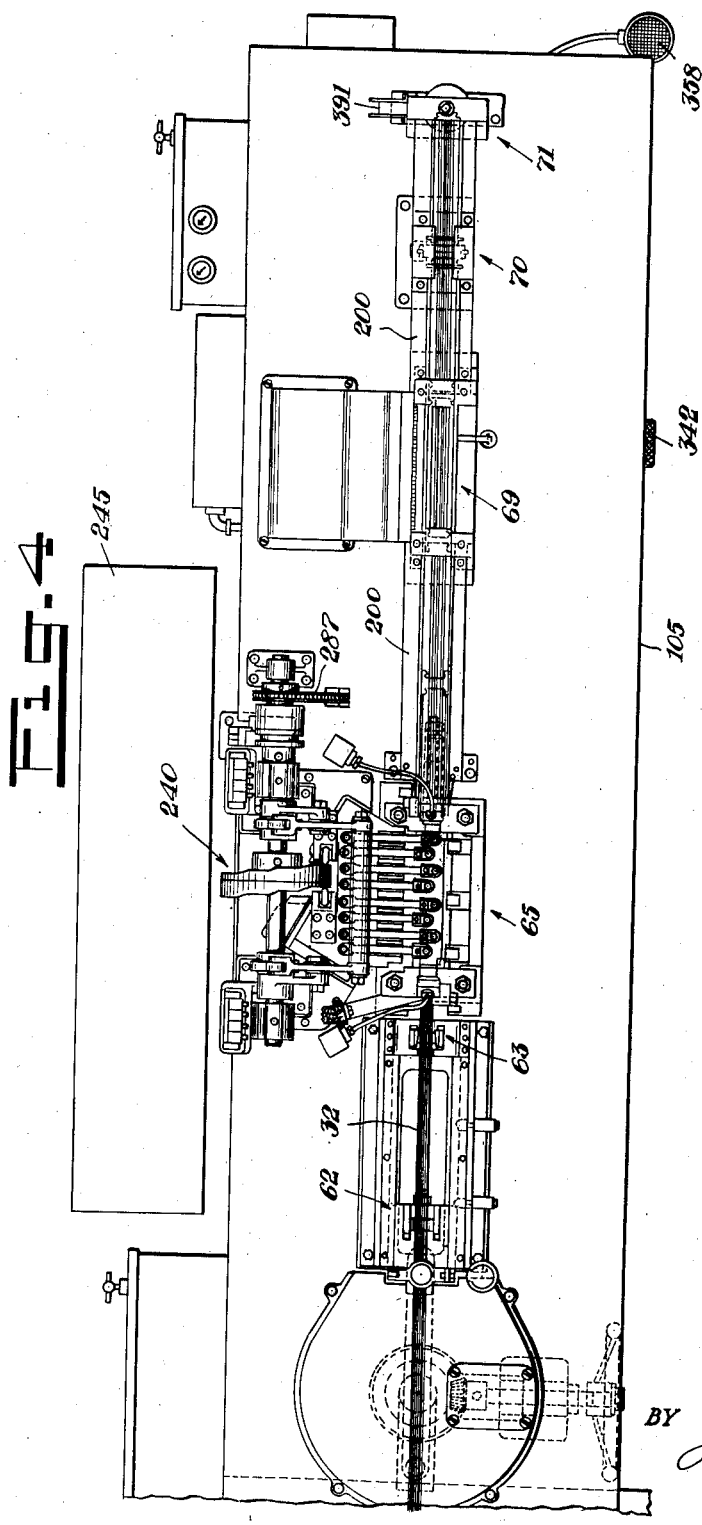

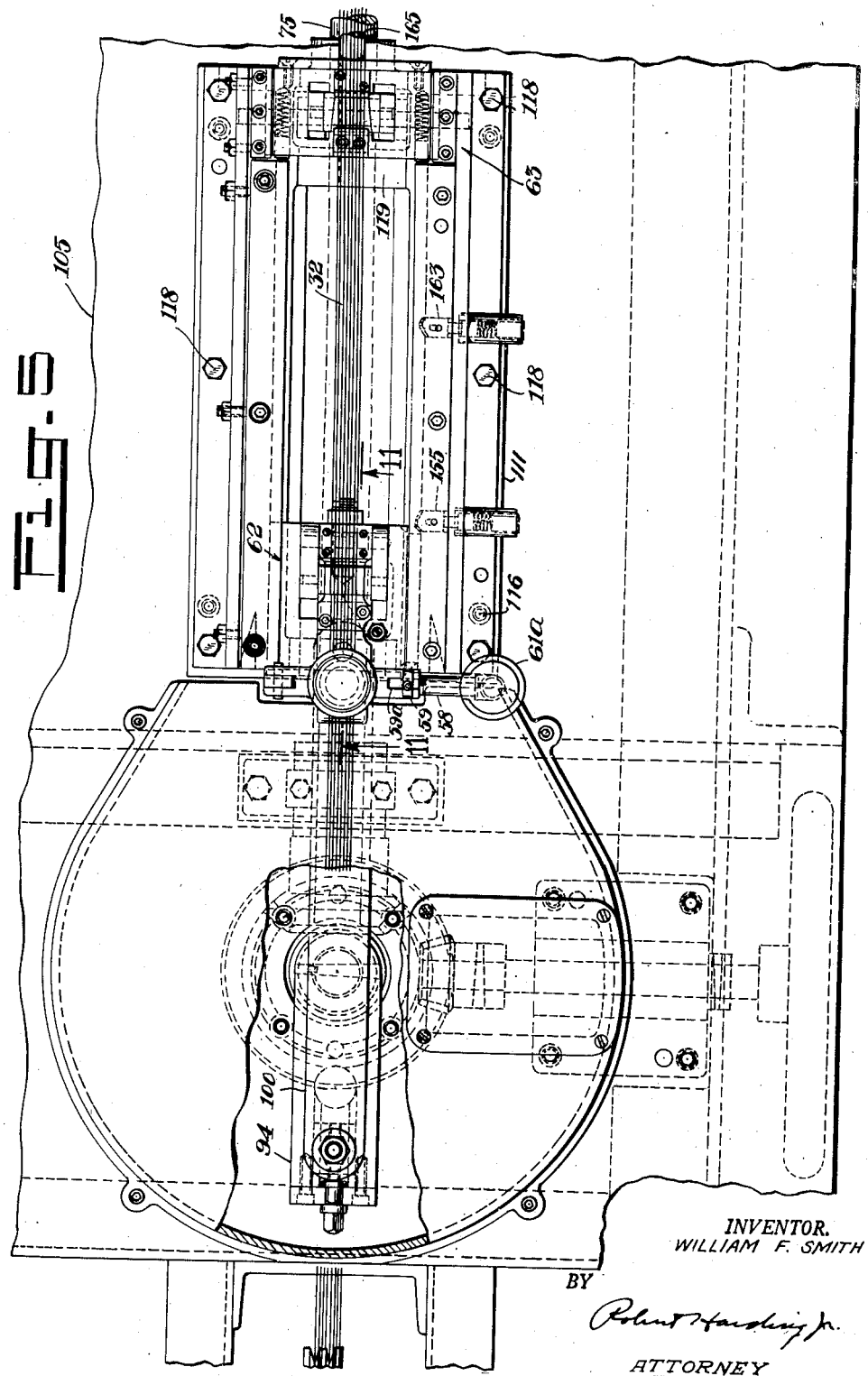

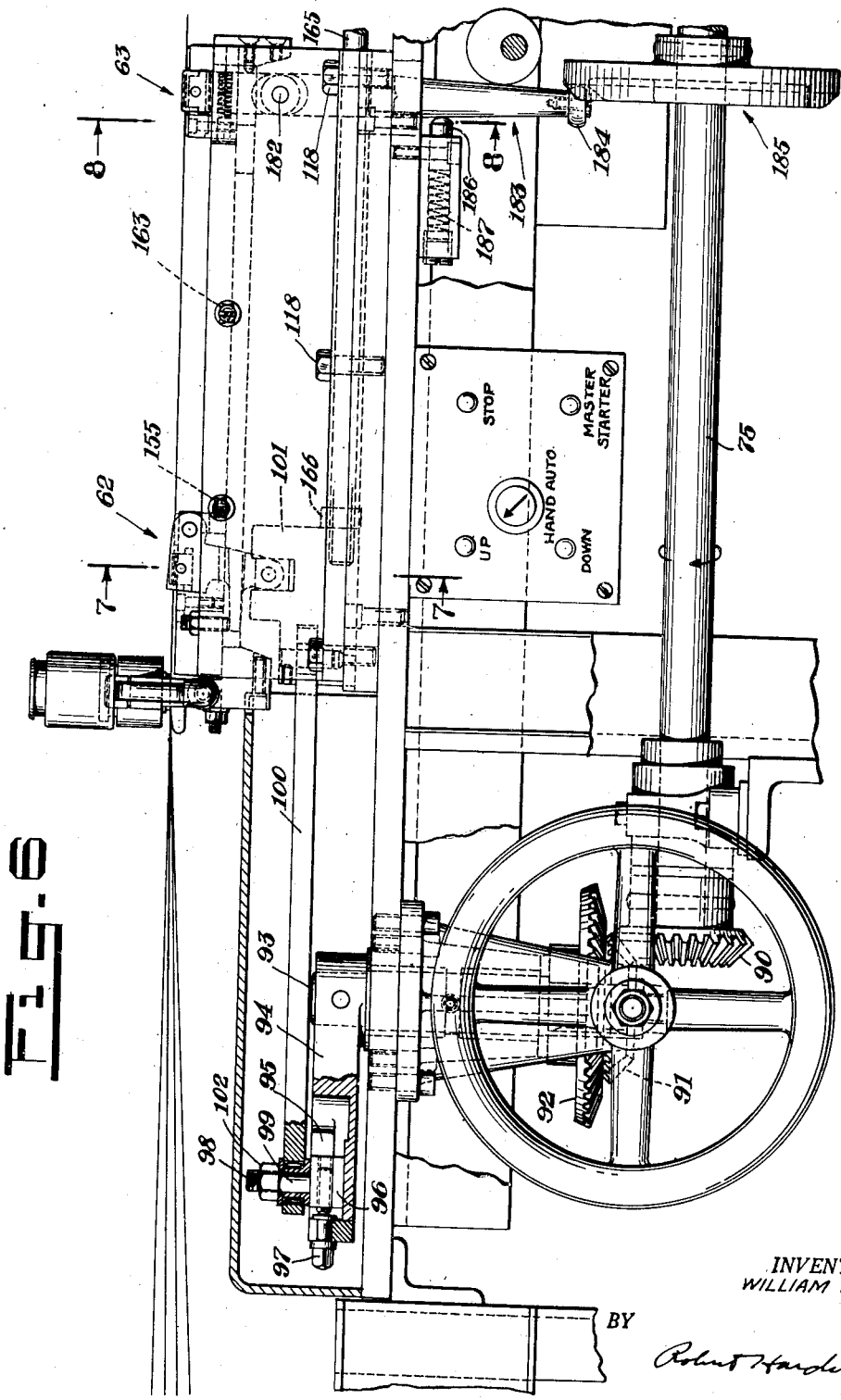

June 28, 1949. W. F. SMITH 2,474,285
BANK STRIP WELDING MACHINE
Filed Feb. 11, 1947 24 Sheets-Sheet 7
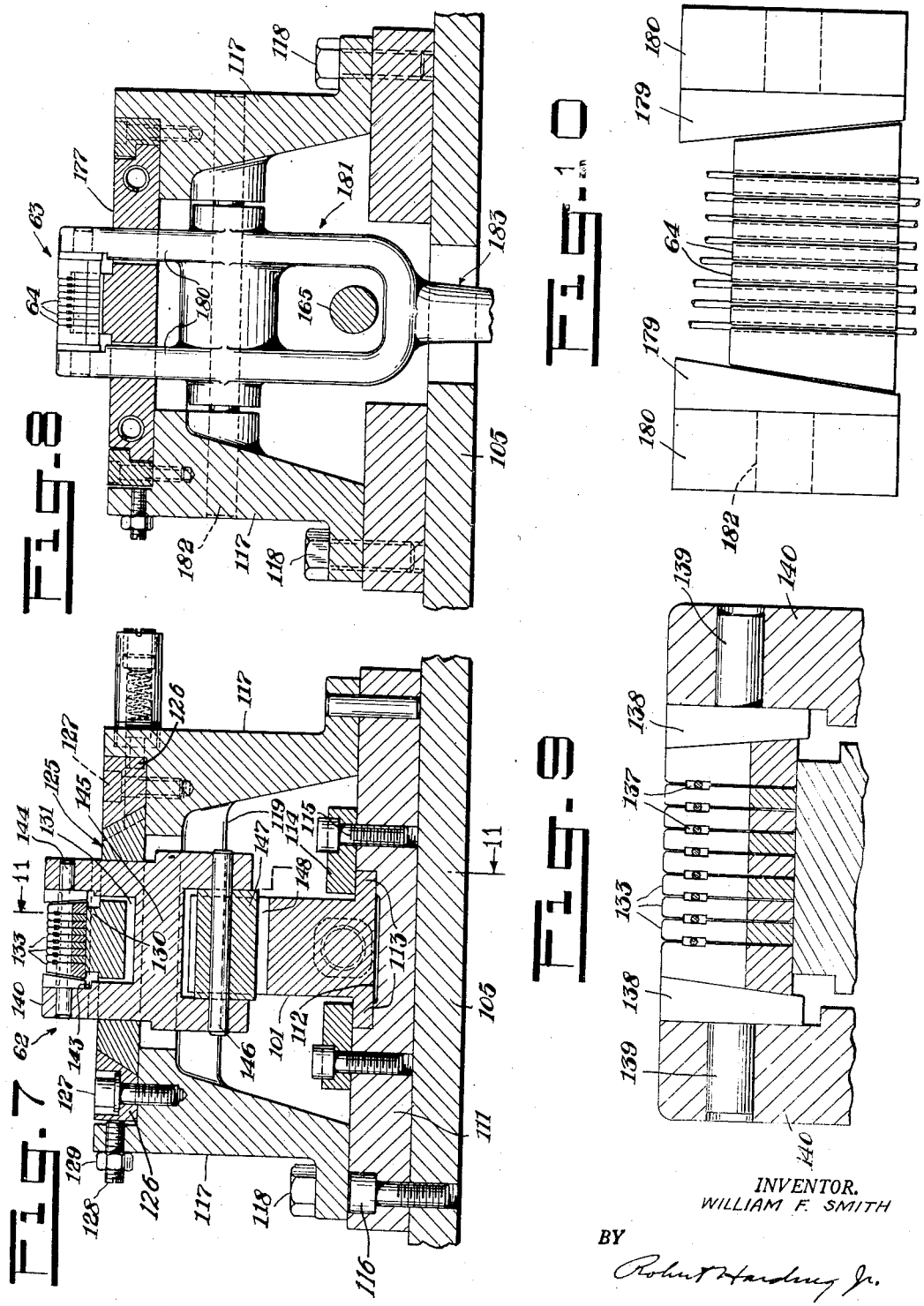
INVENTOR.
WILLIAM F. SMITH
BY
Robert Harding Jr.
ATTORNEY June 28, 1949.
W. F. SMITH
2,474,285
BANK STRIP WELDING MACHINE
Filed Feb. 11, 1947
24 Sheets-Sheet 8
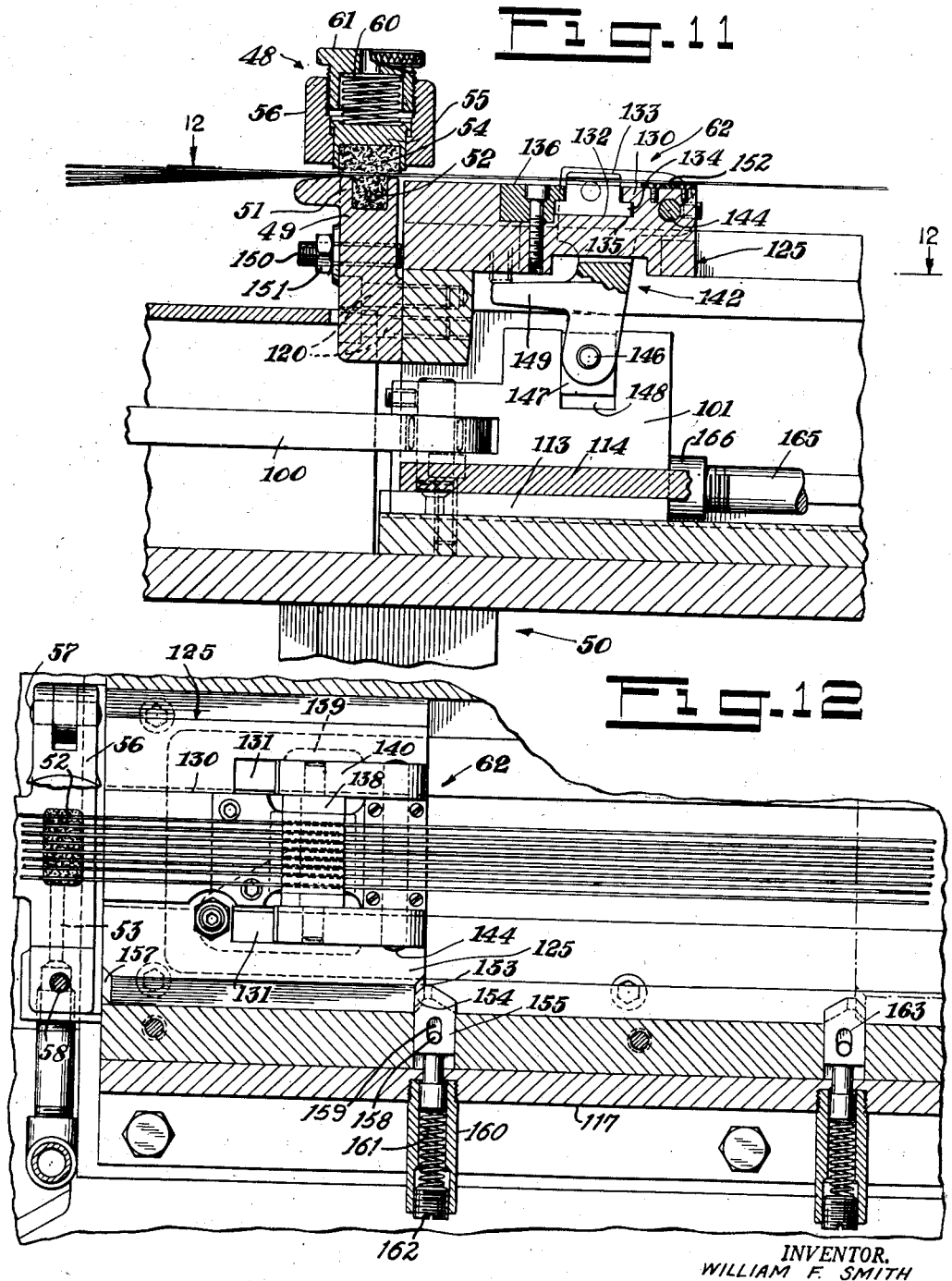
INVENTOR.
WILLIAM F. SMITH
BY
*Robert Harding Jr.*
ATTORNEY

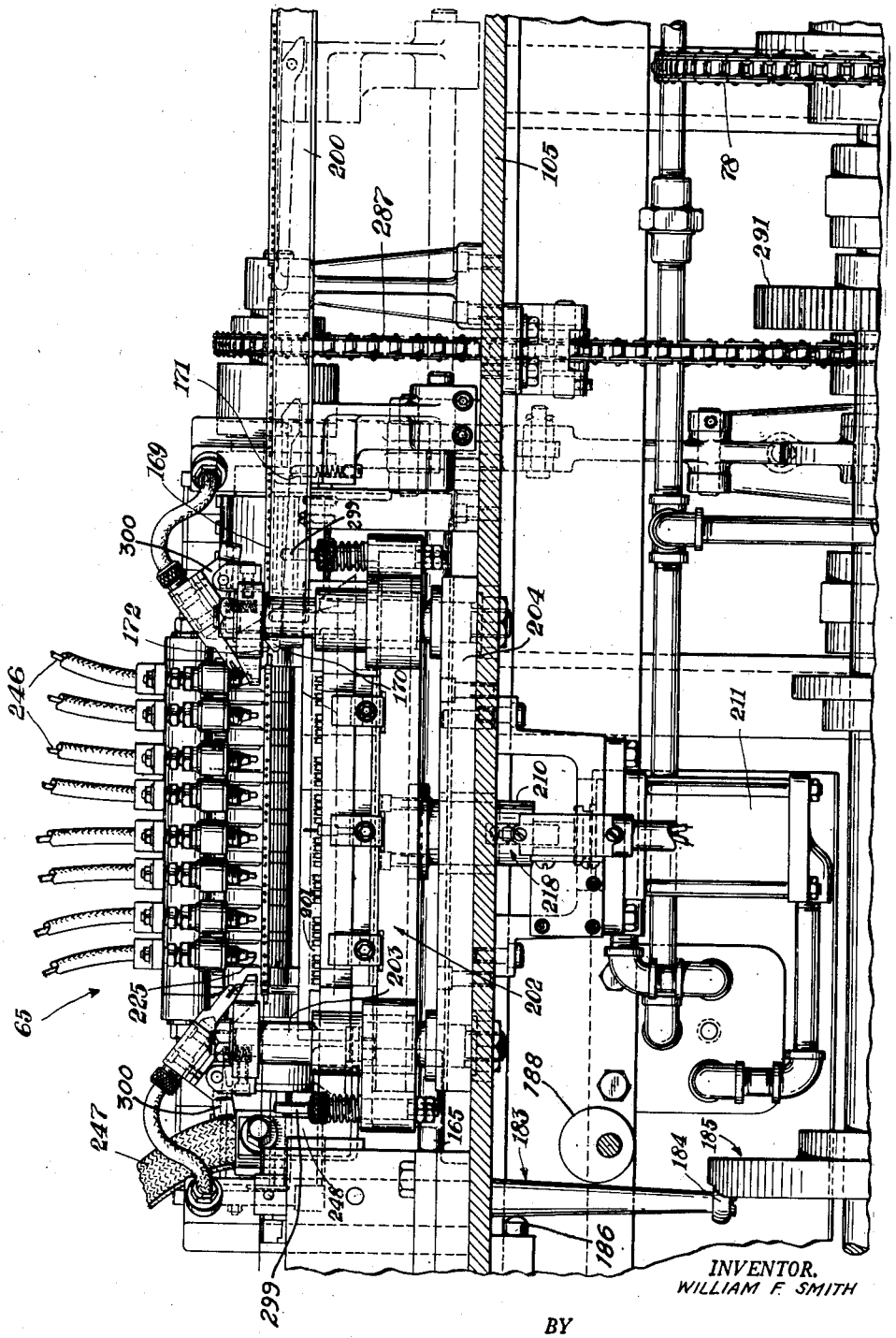

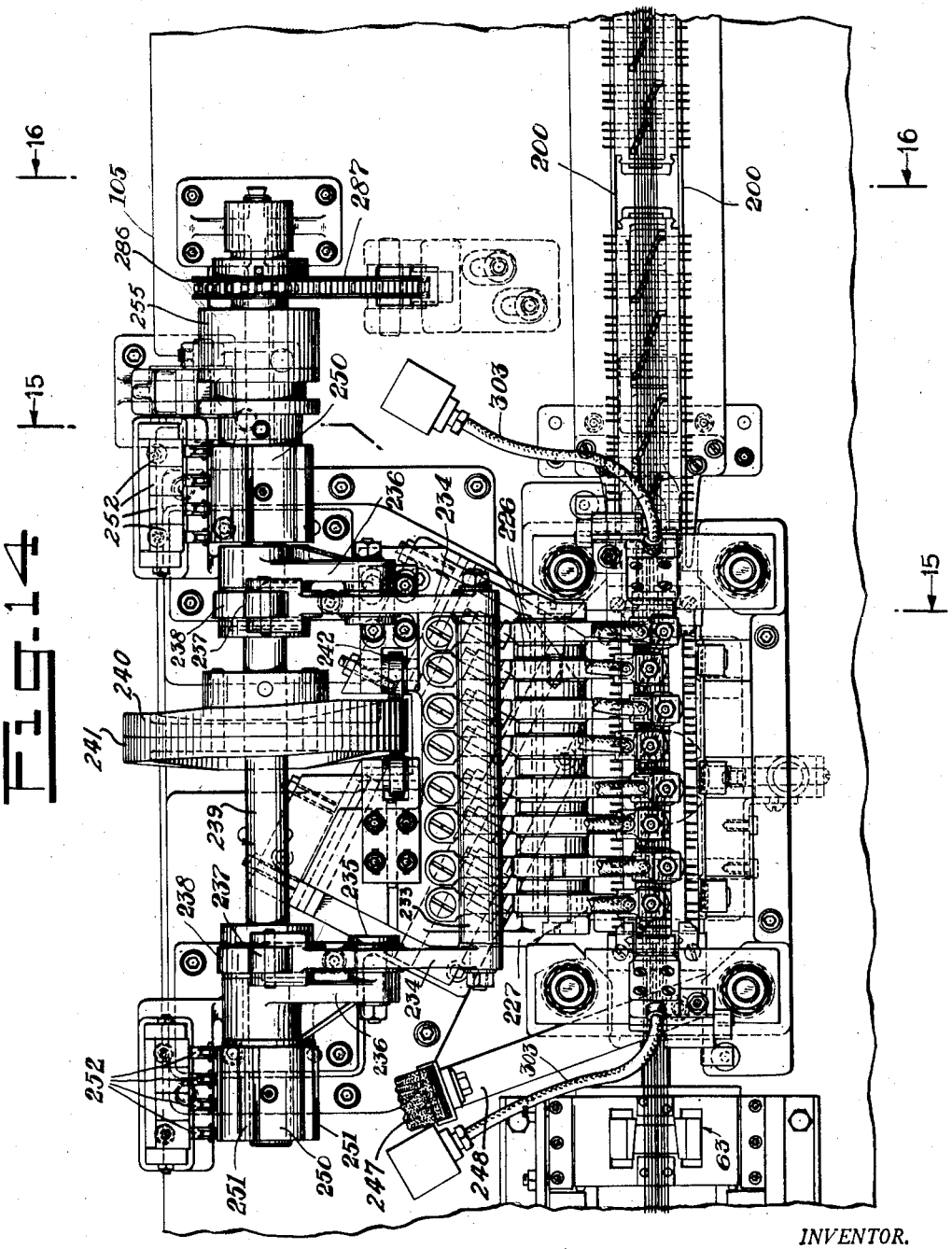

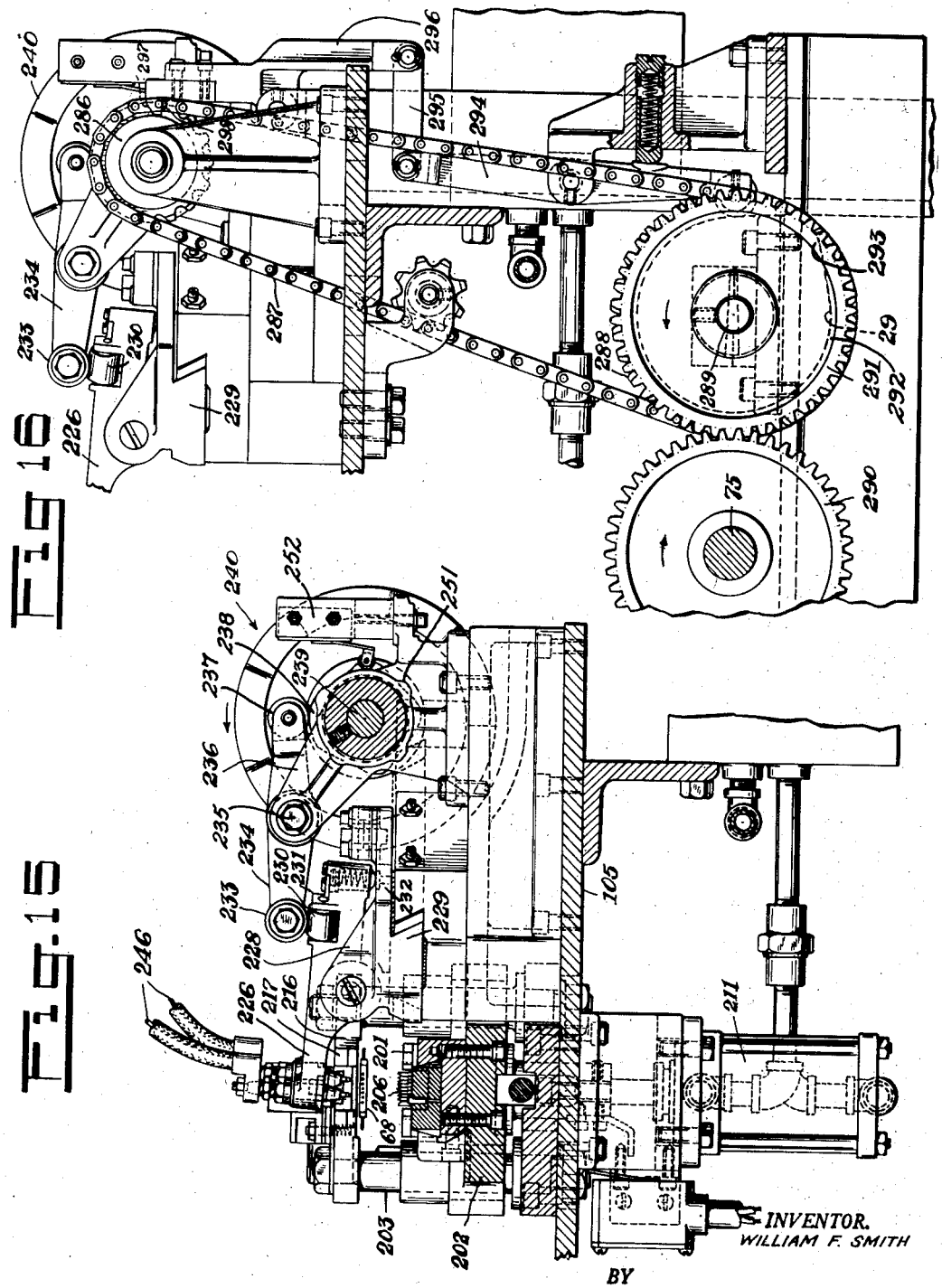

June 28, 1949.  W. F. SMITH  2,474,285
BANK STRIP WELDING MACHINE
Filed Feb. 11, 1947  24 Sheets-Sheet 12

INVENTOR.
WILLIAM F. SMITH
BY Robert Harding Jr.
ATTORNEY

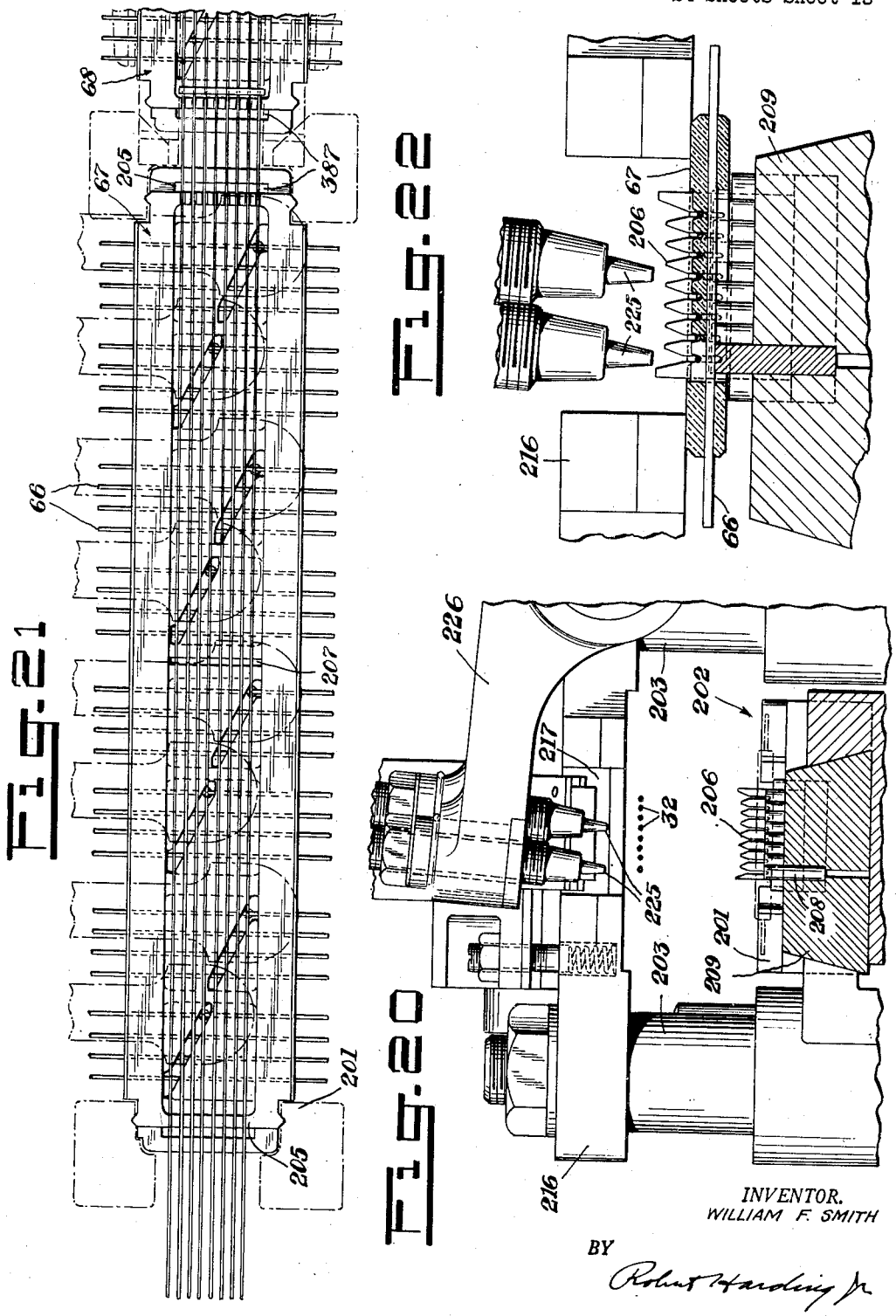

June 28, 1949. W. F. SMITH 2,474,285
BANK STRIP WELDING MACHINE
Filed Feb. 11, 1947 24 Sheets-Sheet 14
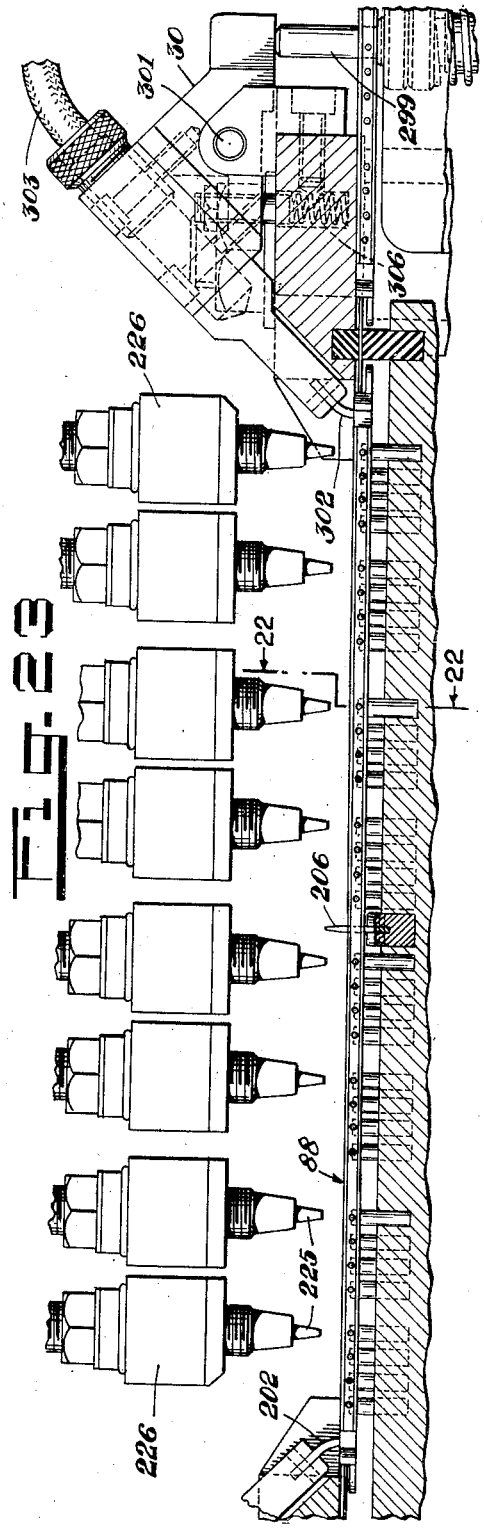
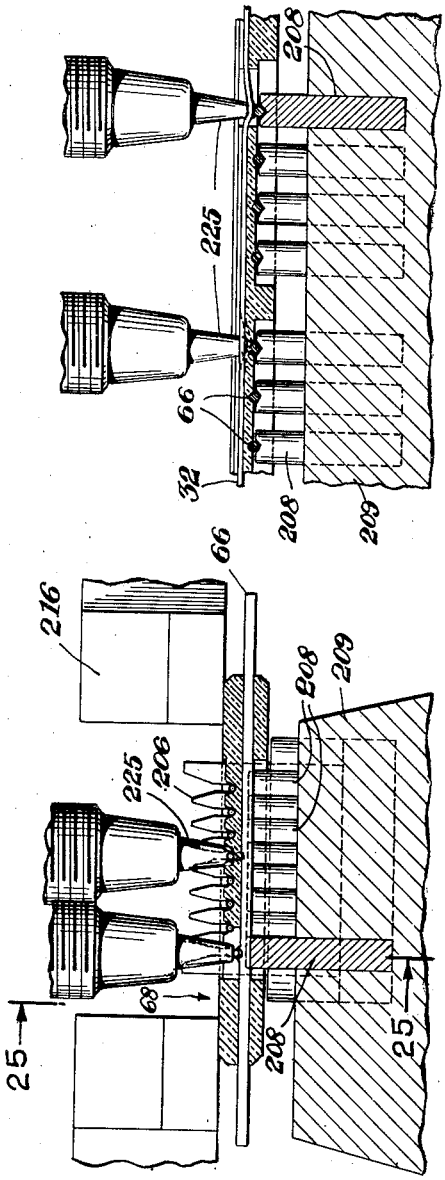
INVENTOR.
WILLIAM F. SMITH
BY
ATTORNEY June 28, 1949.  W. F. SMITH  2,474,285
BANK STRIP WELDING MACHINE
Filed Feb. 11, 1947  24 Sheets-Sheet 15
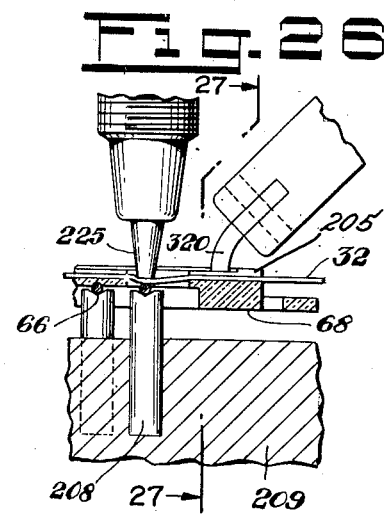
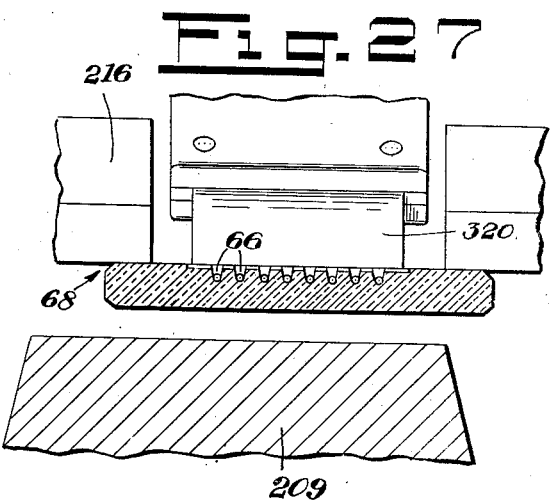
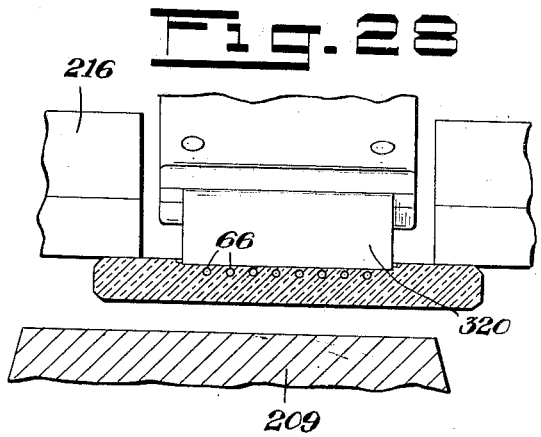
INVENTOR.
WILLIAM F. SMITH
BY
ATTORNEY

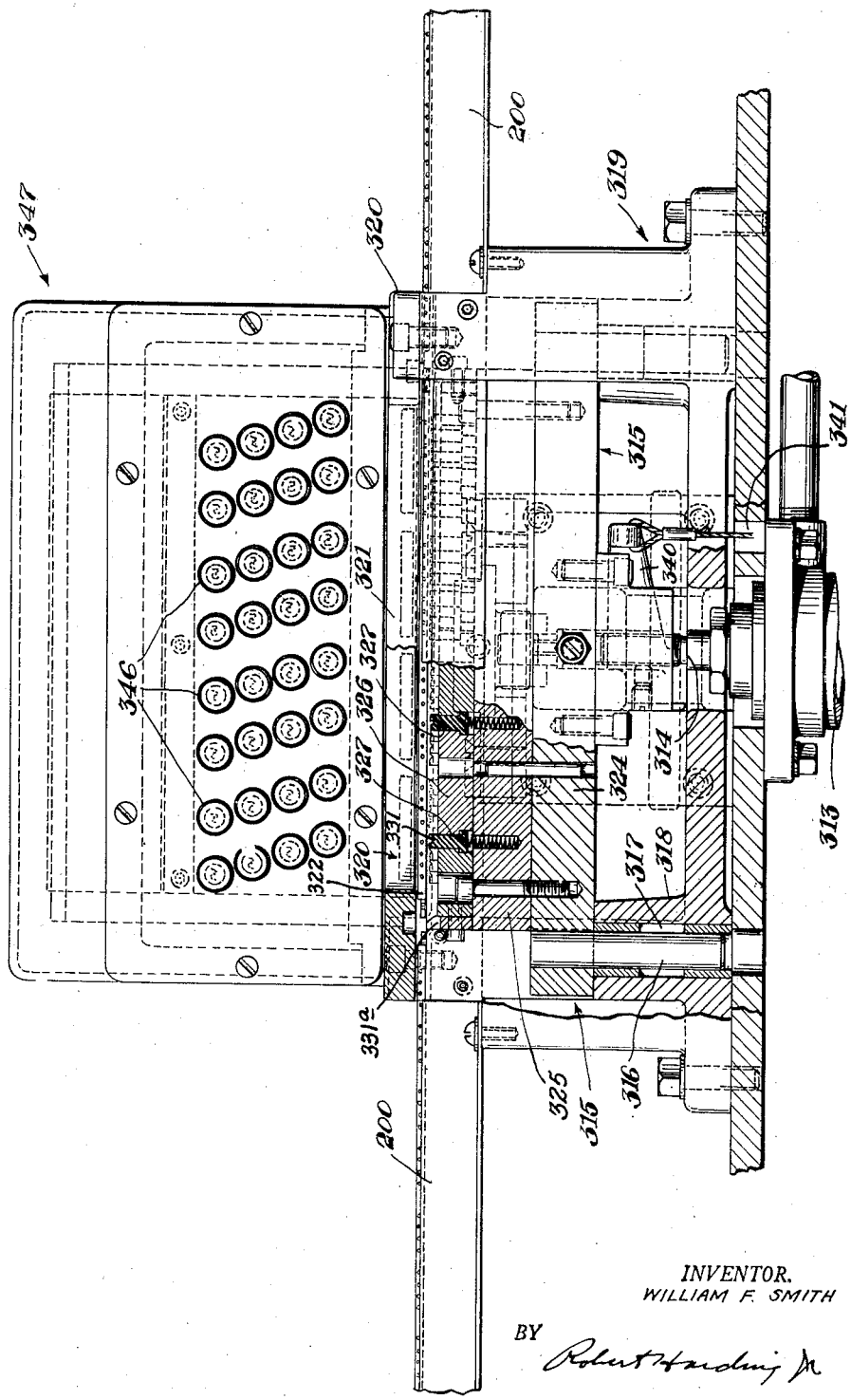

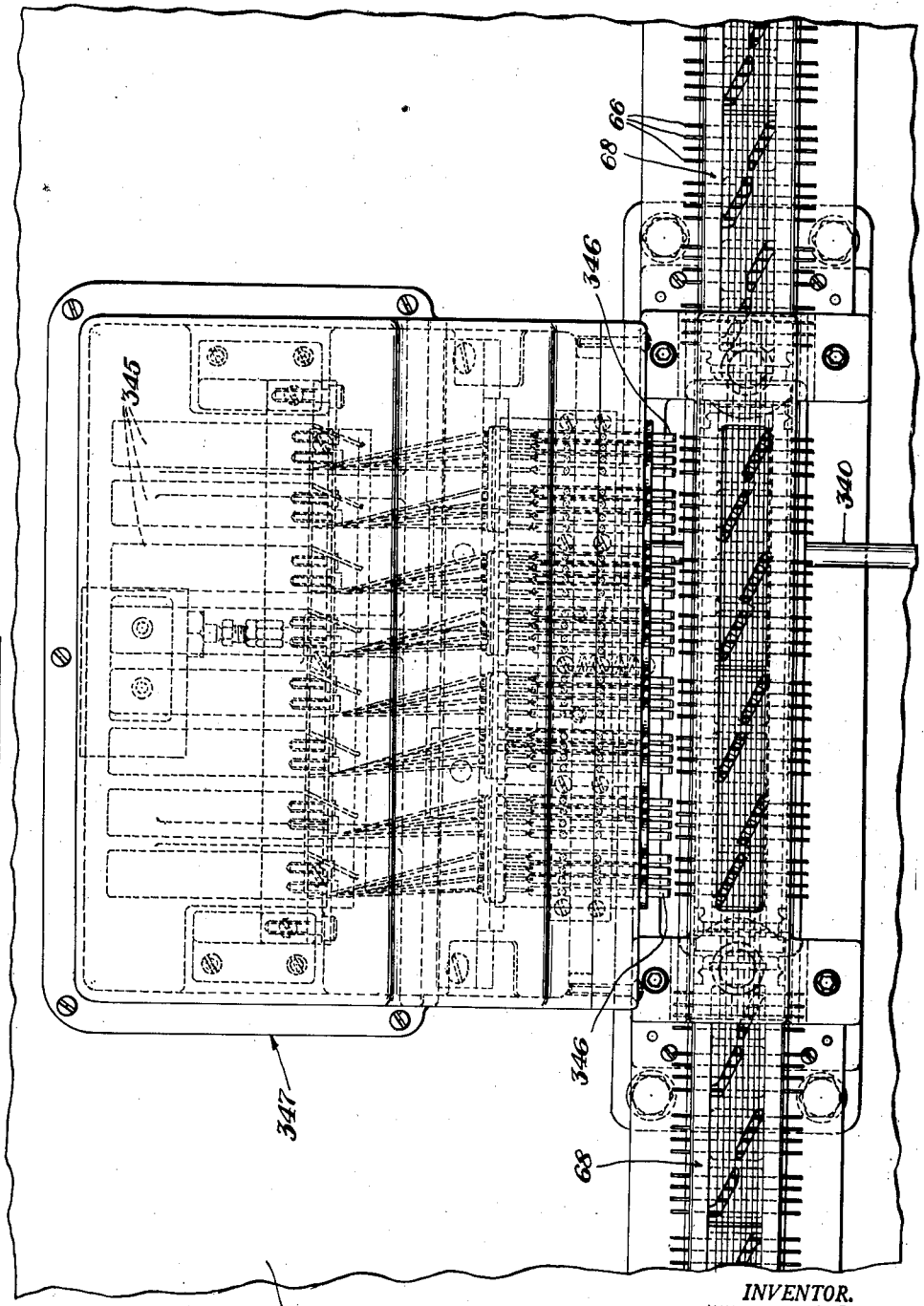

June 28, 1949. W. F. SMITH 2,474,285
BANK STRIP WELDING MACHINE
Filed Feb. 11, 1947 24 Sheets-Sheet 18
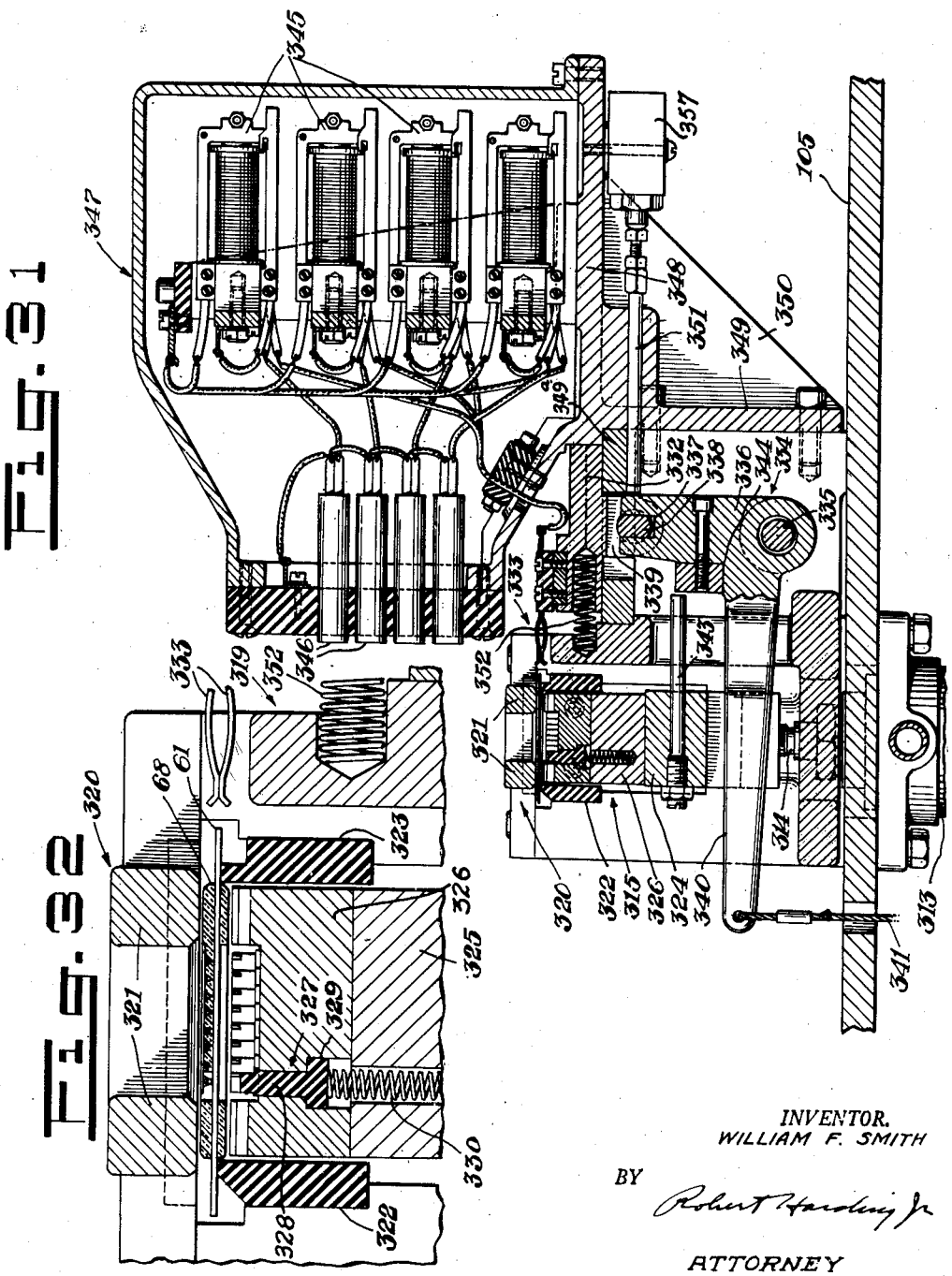
INVENTOR.
WILLIAM F. SMITH
BY
*Robert Harding Jr*
ATTORNEY June 28, 1949. W. F. SMITH 2,474,285
BANK STRIP WELDING MACHINE
Filed Feb. 11, 1947 24 Sheets-Sheet 19
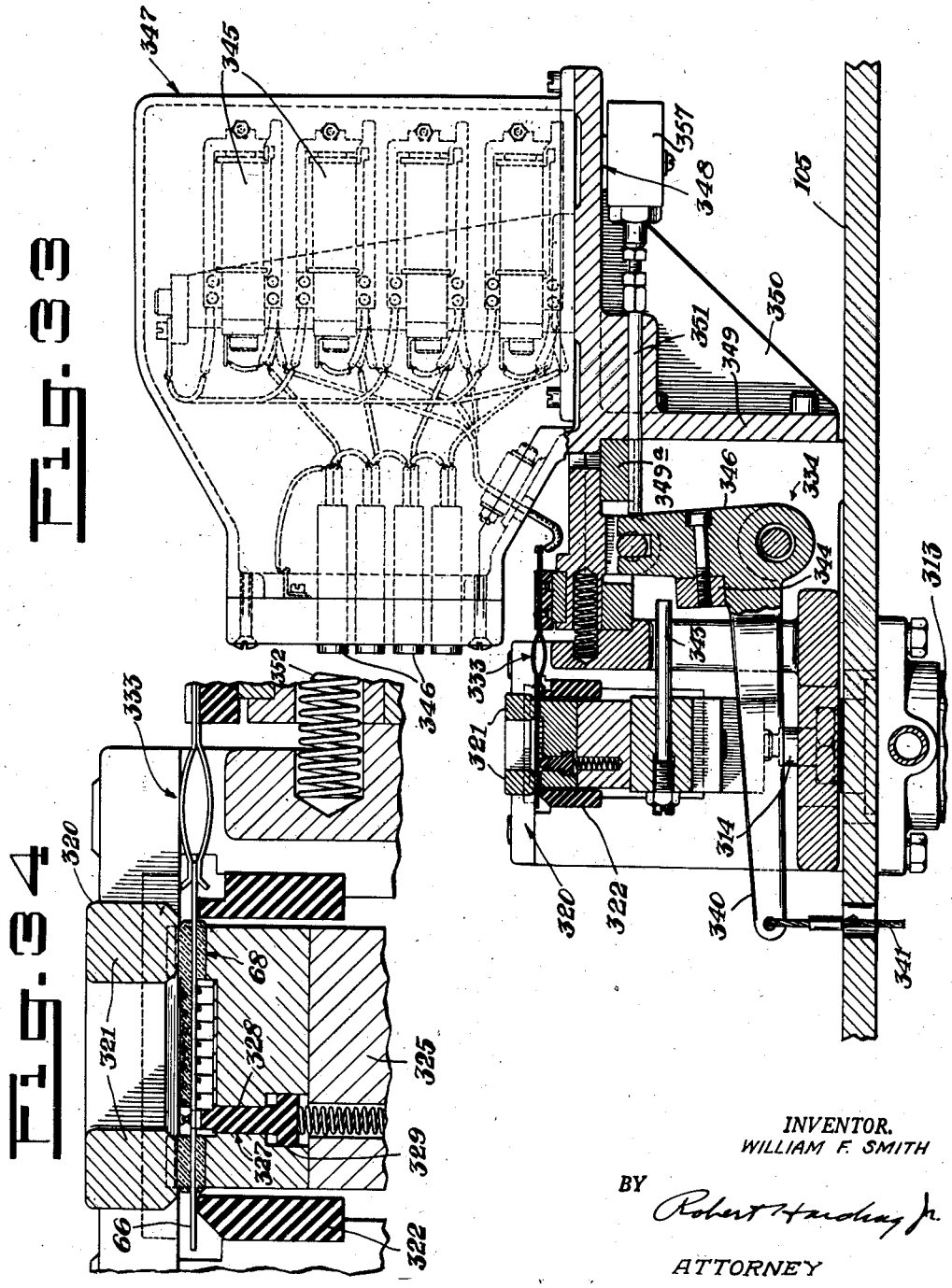
INVENTOR.
WILLIAM F. SMITH
BY
ATTORNEY

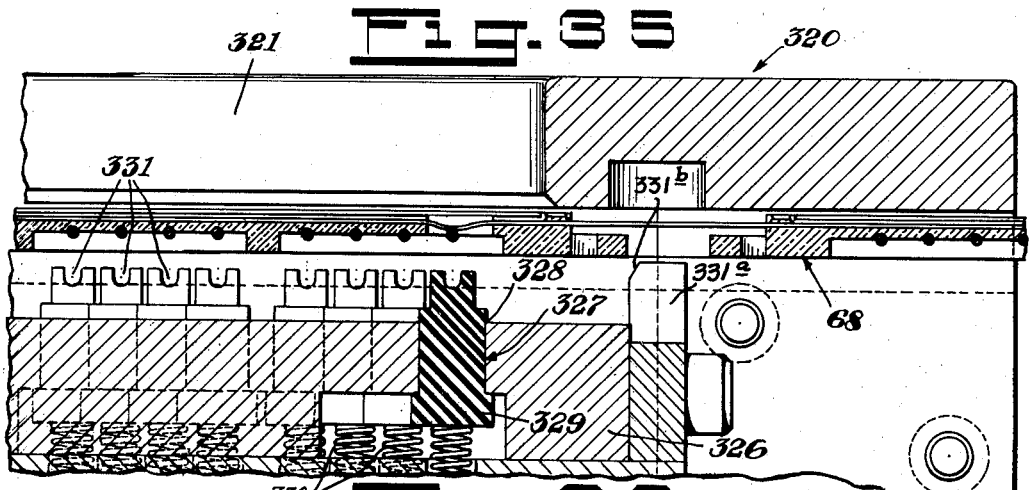
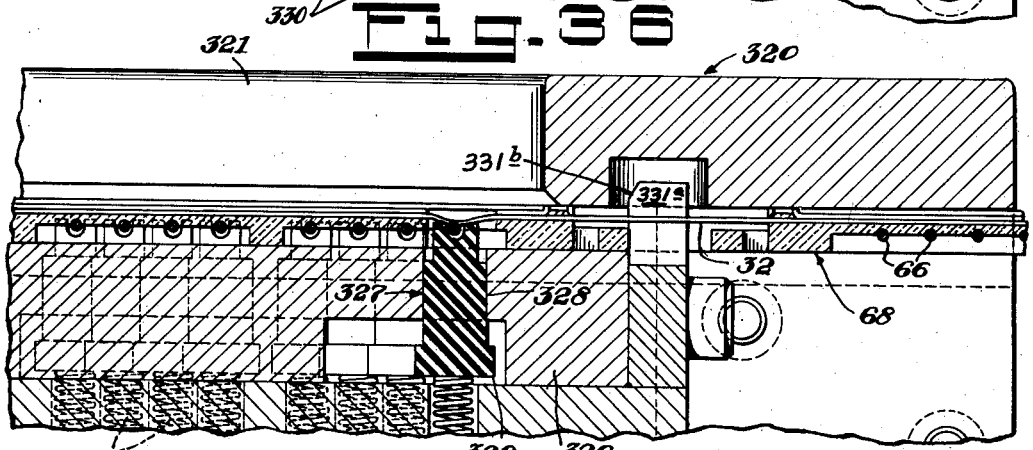
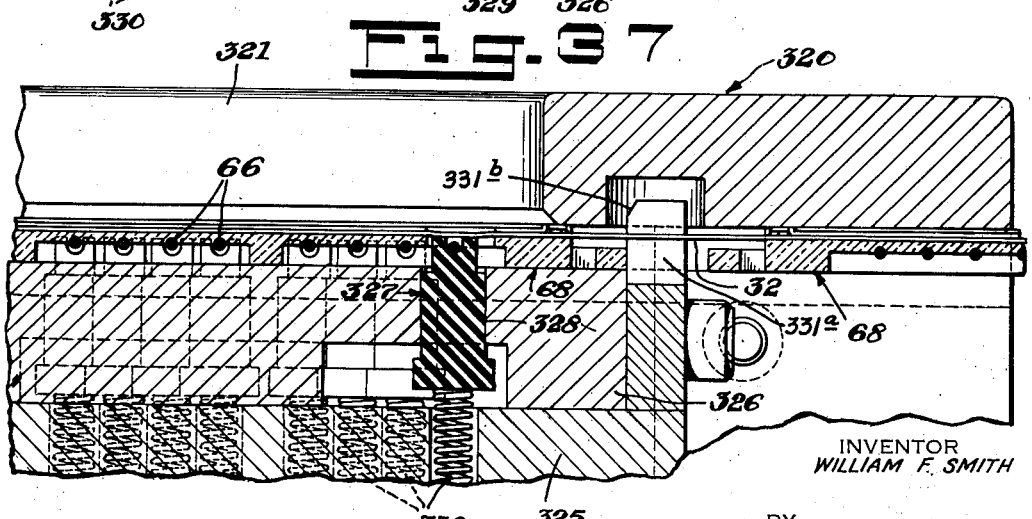

June 28, 1949.    W. F. SMITH    2,474,285
BANK STRIP WELDING MACHINE
Filed Feb. 11, 1947    24 Sheets-Sheet 21
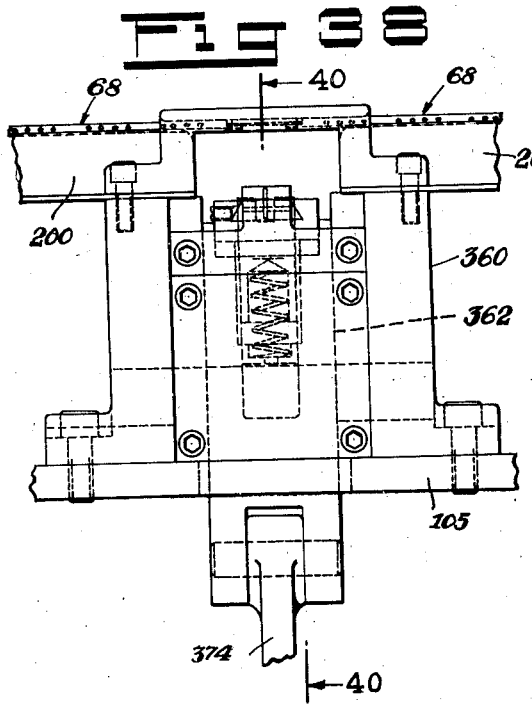
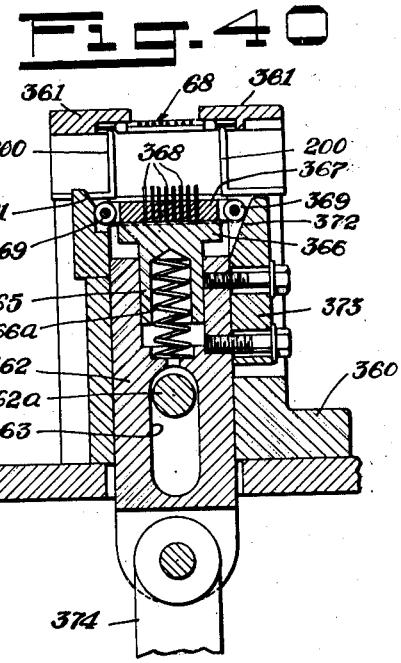
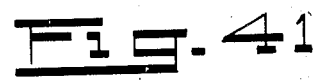
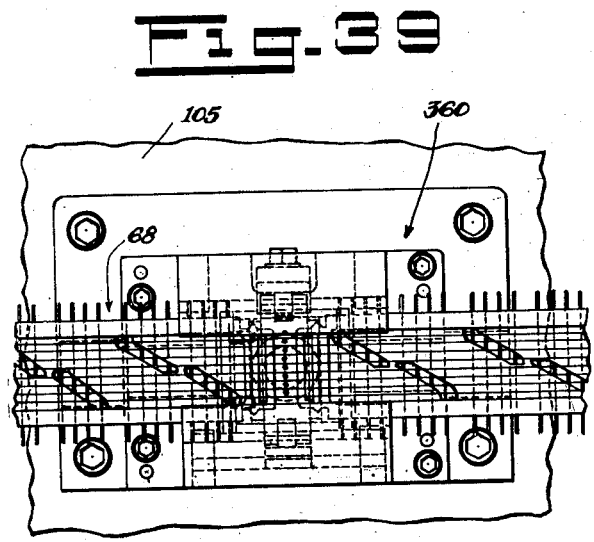
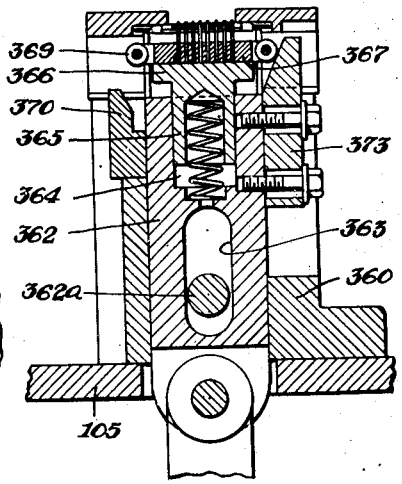
INVENTOR.
WILLIAM F. SMITH
BY
Robert Harding Jr.
ATTORNEY June 28, 1949.   W. F. SMITH   2,474,285
BANK STRIP WELDING MACHINE
Filed Feb. 11, 1947   24 Sheets-Sheet 22

INVENTOR.
WILLIAM F. SMITH
BY
Robert Harding Jr.
ATTORNEY

June 28, 1949.   W. F. SMITH   2,474,285
BANK STRIP WELDING MACHINE
Filed Feb. 11, 1947   24 Sheets-Sheet 23

INVENTOR.
WILLIAM F. SMITH
BY Robert Harding Jr.
ATTORNEY

June 28, 1949.  W. F. SMITH  2,474,285
BANK STRIP WELDING MACHINE
Filed Feb. 11, 1947  24 Sheets-Sheet 24
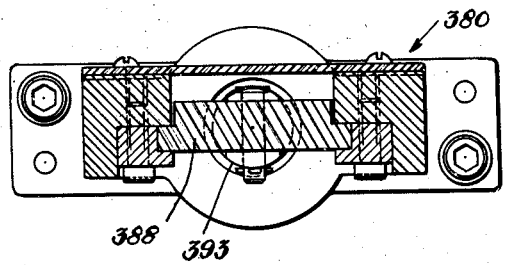
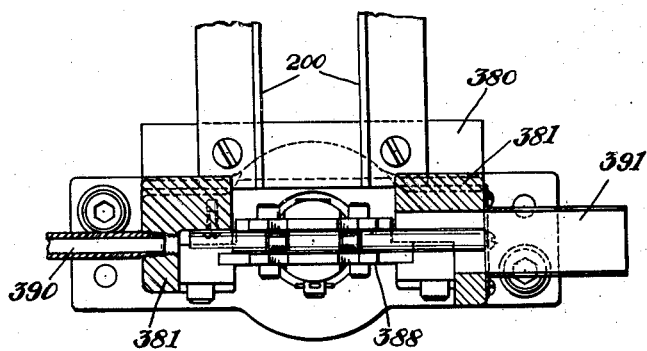
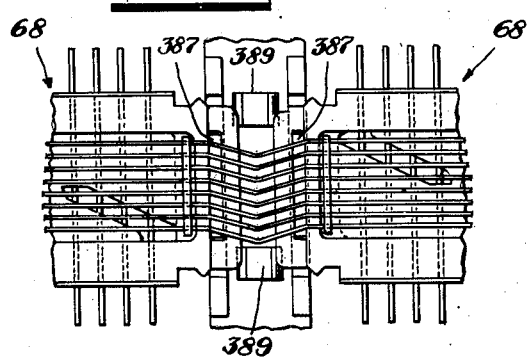  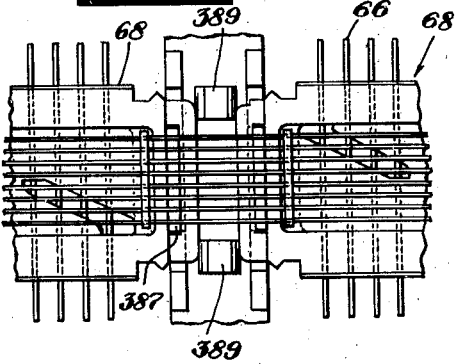
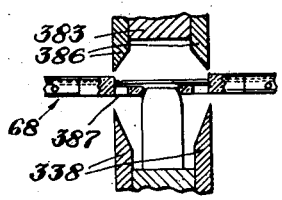  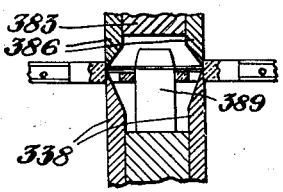
INVENTOR.
WILLIAM F. SMITH
BY
Robert F. Harding Jr.
ATTORNEY Patented June 28, 1949

2,474,285

UNITED STATES PATENT OFFICE 2,474,285

BANK STRIP WELDING MACHINE

William Francis Smith, Brooklyn, N. Y., assignor to International Standard Electric Corporation, New York, N. Y., a corporation of Delaware Application February 11, 1947, Serial No. 727,802

27 Claims. (Cl. 219—4)

The present invention relates to a welding machine wherein terminal pins secured in a bank strip body of suitable insulating material may be welded to mutiple or multiplying wires, and more particularly to a machine, wherein the welds may be made a plurality at a time.

The main object of the invention is to provide a novel and advantageous machine for welding terminal pins in a bank strip body to multiple or multiplying wires with said wires accurately spaced and held in position on the bank strip body.

Another object of the invention is to provide a machine of the character specified wherein the welding is carried out in a plurality of operations in each of which a plurality of welds is produced.

Still another object of the invention is to provide a novel and advantageous machine wherein not only are the welds effected at the desired crossings of the selector pins and multiple wires but the wires are secured at the ends of the bank strips to maintain the wires under tension, thus retaining them in proper position on the bank strip.

Yet another object of the invention is to provide a welding machine wherein after advance beyond the welding station or zone, the wires between successive strips may be bent to provide slack between the strips, thus facilitating the assembly of the bank strips in banks.

A further object of the invention is to provide a welding machine of the character specified wherein the welds are tested as to electrical connection.

A still further object of the invention is to provide a welding machine having at the discharge side of the welding station bank-strip-cut-off means adapted to cut-off bank strips or strings thereof.

According to one embdoiment of the present invention, the welding machine is adapted to take the products of the machine of William F. Smith application Ser No. 730,969, filed February 26, 1947, namely bank strip bodies of insulating material with selector pins molded therein, apply longitudinal wires thereto, weld said wires to the selector pins at their crossings and secure the wires in the insulating material at the ends of the strips, bend the longitudinal wires between bank strips to provide necessary slack for stacking them in banks, and finally cut off the finished strips singly or in strings preferably containing two, four or six bank strips, the products disclosed and claimed in William F. Smith application Ser. No. 721,977, filed January 14, 1947.

Each selector pin strip contains eight groups of four pins each and there are eight longitudinal wires. Each pin is connected to a single wire and it takes two successive groups of four each, that is eight pins, for connection by welding to the corresponding wires. Thus there are thirty-two welds to be made for each strip. Preferably the welds for a strip are made in four operations of eight welds each.

Other objects, features and advantages will appear upon consideration of the following detailed description and of the drawings, in which:

Figs. 1 and 2 are views in side elevation which when placed end to end with common parts overlapping constitute a side elevation of the entire machine.

Fig. 3 is a top plan view of the structure shown in Fig. 1.

Fig. 3A is a fragmentary view partly in section illustrating the frictional connection between a spool supporting a wire reel and a shaft on which the spool is mounted.

Fig. 4 is a top plan view of the structure shown in Fig. 2.

Fig. 5 is a fragmentary top plan view on an enlarged scale of the part of the wire advancing means between the wire reel rack and the welding mechanism proper.

Fig. 6 is a side elevation partly broken away, of the structure shown in Fig. 5.

Fig. 7 is a section on the line 7—7 of Fig. 6.

Fig. 8 is a section on the line 8—8 of Fig. 6.

Fig. 9 is a section view on an enlarged scale of structure in the central upper part of Fig. 7.

Fig. 10 is a top plan view on an enlarged scale of the structure in the central upper part of Fig. 8.

Fig. 11 is a section taken along the line 11—11 of Fig. 7.

Fig. 12 is a view from above taken along the line 12—12 of Fig. 11.

Fig. 13 is a fragmentary view on an enlarged scale of the welding section illustrated in Fig. 2.

Fig. 14 is a top plan view of the apparatus shown in Fig. 13.

Fig. 15 is a section taken along the line 15—15 of Fig. 14.

Fig. 16 is a section taken along the line 16—16 of Fig. 14.

Fig. 20 is a fragmentary view of the welding apparatus as viewed from the right in Fig. 14, parts being broken away and the ram being depressed;

Fig. 21 is a diagrammatic top plan view showing a terminal pin strip in the welding position and to the right thereof a fragment of a completed bank strip;

Fig. 22 is a section taken along the line 22—22 of Fig. 23;

Fig. 23 is a fragmentary elevation partly in section of the structure shown in Fig. 22;

Fig. 24 is a view similar to Fig. 22 but with the welding points down in welding position;

Fig. 25 is a section taken along the line 25—25 of Fig. 24.

Fig. 26 is a view on a larger scale showing the right hand front welding point of Fig. 23 in depressed position for welding and also in depressed position the heating element for sealing the longitudinal wires in the end of the bank strip;

Fig. 27 is a section taken along the line 27—27 of Fig. 26;

Fig. 28 is a view similar to Fig. 27 but showing the longitudinal wires sealed in the end of the bank strip;

Fig. 29 is a fragmentary front elevation of the weld-testing device with parts broken away;

Fig. 30 is a top plan view of the structure of Fig. 29, interior parts being shown in dotted lines;

Fig. 31 is a vertical sectional view of the structure of Fig. 29 as viewed from the right;

Fig. 32 is a view on a larger scale of parts of the structure of Fig. 31;

Fig. 33 is a view similar in general to Fig. 31 but with the jacks engaging the terminal pins;

Fig. 34 is a view similar to Fig. 32 showing the parts in the Fig. 33 position;

Fig. 35 is a fragmentary sectional view with the testing ram depressed;

Fig. 36 is a view similar to Fig. 35 with the testing ram raised and indicates a good weld;

Fig. 37 is a view similar to Fig. 36 but indicating a weld failure;

Fig. 38 is an enlarged front elevation of the wire forming unit, the parts being shown in their home positions;

Fig. 39 is a plan view of the structure shown in Fig. 38;

Fig. 40 is a cross section taken along the line 40—40 of Fig. 38;

Fig. 41 is a view similar to Fig. 40 but with the parts in the positions assumed at the end of the first stage of operation, that is with the longitudinal wires between bank strips still unbent;

Fig. 48 is a section taken along the line 48—48 of Fig. 46;

Fig. 49 is a section taken along the line 49—49 of Fig. 46;

Fig. 50 is a fragmentary view illustrating the adjacent ends of two successive bank strips at the beginning of the positioning operation preparatory to the cutting operation, the connecting wires being straightened in the positioning operation;

Fig. 51 is a fragmentary sectional view showing the parts in the positions shown in Fig. 50;

Fig. 52 is a fragmentary top plan view showing the parts in the positions assumed at the end of the cutting operation; and Fig. 53 is a sectional view similar to Fig. 51 but with the cutting operating completed, and the bank strips in the positions assumed at the time of the cutting operation.

Figure 1:
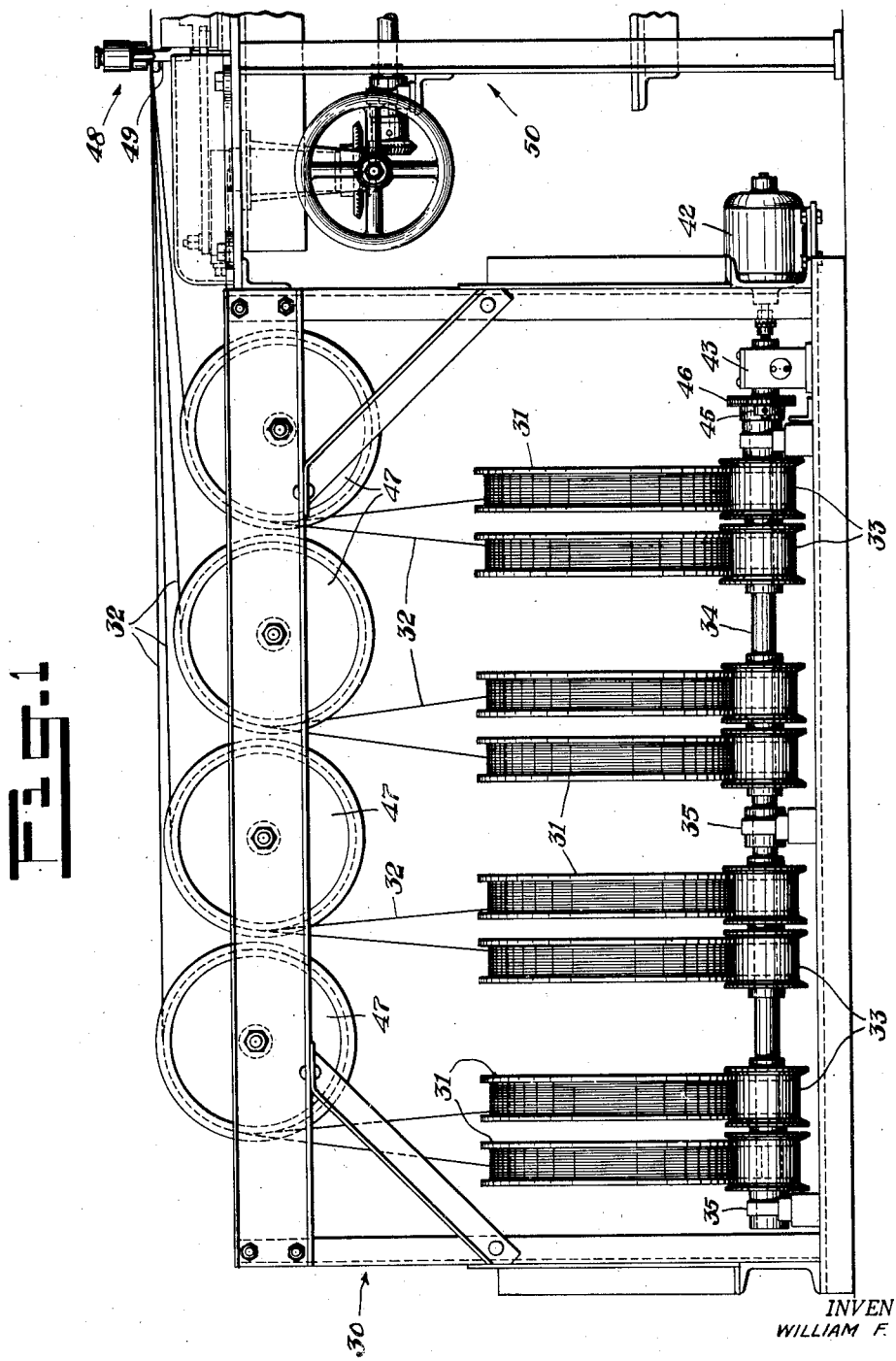

Referring to the drawings, there is a wire reel rack 30 on which are mounted eight reels 31 carrying wires 32 of suitable material such as copper. The reels 31 are of substantial diameter and each is supported by two spools 33 mounted on shafts 34 at opposite sides of the base of the rack. Shafts 34 are mounted in bearings 35 and spools 33 are held in pairs against movement longitudinally of the shafts by collars 36, one between the spools of each pair, and collars 37 at the outside ends of the spools of each pair held in position by set screws 38.

In order to put proper tension on the wire as drawn from the reels 31 the spools 33 are held against frictional movement on the shafts by means of friction devices 39 (Fig. 3A). These devices are cylindrical in form and have closed upper ends which are screw threaded to screw into suitable openings in the barrel of each spool 33. Near the open end of each device 39 is a friction member 40 which is pressed against the shaft 34 by means of a helical spring 41 interposed between the member 40 and the closed top of the device 39. The closed end of said device 39 is provided with a slot so that it can be screwed into position or removed therefrom by means of a screw driver.

In order to avoid the application of too much stress to the wires when they are pulled suddenly, one of the shafts 34 is also driven at a slow rate. This result is effected by means of a motor 42 acting through a speed reducer 43 driving a shaft 44 on which is mounted a sprocket wheel 45. Such sprocket wheel is connected by means of a sprocket chain 46 to a sprocket wheel 46a on the shaft 34 shown at the upper part of Figure 3.

The wires 32 are drawn upwardly from the reels 31 at one side of the wire reel rack and the wires of each pair of reels enters the two grooves of a sheave 47 and extend to the right to a wire cleaning device 48. As clearly shown in Figure 1 the pivots of successive sheaves are progressively lower from left to right so that the wires from sheaves farther from the device 48 pass above those from nearer sheaves.

The wire cleaning device comprises said part 49 mounted on the main frame 50 which also supports the welding mechanism and other parts. In the top of member 49 there is a groove 51 extending transversely of the wires and containing a body 52 of suitable porous material to which suitable fluid such as a lubricant or wire cleaning fluid is introduced through a duct 53 (Figure 12).

The wires 32 pass over said body or pad 52 and are engaged from above by a pad 54 of porous material contained in a groove at the lower face of a member or bar 55 slidably mounted in a bar 56 pivotally supported at one end on a pivot 57 carried by a bracket on side member 49. At the opposite end from said pad the bar 56 is held down by means of a pivotally mounted bolt 58 having at its top a cross head 59 adapted to lock or release said bar 56 by movement through a quarter turn in one direction or another across or along a slot 59a in bar 55 (Fig. 5). Member 55 is pressed downwardly by means of a helical spring 60 which is pressed down from above by a member 61 screw threaded through the top of said bar 56. Said member or 61 is hollow at its lower part to receive the upper end of said spring 60 and has a central perforation. The duct 53 may receive fluid from a grease cup 61a.

From said wire cleaning device 48 the wires 32 pass between the clamping members or plates of a wire feeding device 62 and thence to a wire holding device 63 containing clamping members or plates 64 between which said wires pass to a welding station or unit 65. In said welding station 65 the wires 32 are welded to selector or terminal pins 66 of selector pin strips 67 to form successive bank strips 68 (Figure 21). Both the selector pin strips 67 and the final bank strips 68 are described and claimed in my copending application W. F. Smith, Ser. No. 721,977, filed January 14, 1947.

From the welding station 65 the connected bank strips are advanced step by step to weld-testing station 69 and then to a wire forming or wire bending station 70 at which the wires between successive strips are bent to one side or the other to provide slack to facilitate folding a strip of bank strips into a bank. From the wire forming station 70, the bank strips are advanced through a cutoff device 71 which may be operated to cut off single bank strips or strings of bank strips as desired.

The wire feeding device 62, the wire holding device 63, the welding means 65 and the wire forming station 70 are operated from a shaft 75 extending longitudinally of the machine. This shaft 75 is operated one revolution at a time by means of one revolution clutch 76 which serves to connect the shaft to or disconnect it from a sprocket wheel 77 connected by means of a sprocket chain 78 with a sprocket wheel 79 on a shaft 80 of a speed reducer 81. Said speed reductor 81 is driven through a pulley 82 thereon connected by a belt 83 to a pulley 84 on the shaft 85 of an electric motor 86.

Said electric motor 86 is mounted for movement to and from said reducer 81 in order to regulate the tension of the belt 83. This adjustment of the position of the motor 86 may be effected by means of one or more screws 87 held against longitudinal movement and threaded through brackets 88 connected to the motor support. As indicated each shaft 87 may be manually operated by handle 89 eccentrically positioned on a disk 90 fixed on the screw.

At the left of Figure 2, the shaft 75 is provided with a bevel gear 91 meshing with a bevel gear 92 on a vertical shaft 93. Fixed on the top of said shaft 93 is an arm 94 having a longitudinal slot 95 in which slides a block 96. The position of block 96 along said slot is regulated by a screw 97 held against longitudinal movement in the end of said arm 94 and threaded into said block 96 so that by turning the screw 97 in the proper direction the position of the block from the axis of shaft 92 may be varied. Said block 96 carries a pin 98 projecting through a bearing 99 fixed in the end of a pitman 100 connected at its other end to a slide 101 by means of a pivot 102. The end of said pitman 100 is held on said pin 98 by means of a nut 102. Obviously the throw of slide 101 may be adjusted by adjusting the position in said slot 95 of the block 96 carrying said pin 98.

Said frame 50 which supports all of the apparatus except the wire reel rack 30, comprises a table 105 supported by legs 106 at opposite ends thereof and legs 107 at on intermediate position. Also supported by said legs 106 and 107 is a lower table 108 which at an intermediate position is connected to the table 105 or to a longitudinal member 109 which serves to support said table 105 against bending. Each motor-adjusting screw 87 is supported and held against longitudinal movement by brackets 110 fixed on said table or platform 105. The speed reducer is also mounted on said table 108.

Mounted on table 105 at the wire-receiving end is a longitudinal plate 111 having at its upper side a broad, shallow guide groove 112 to receive the lower part and base flanges 113 of slide 101 (see Figs. 5, 7 and 9). Said slide 101 is held in said groove by members 114 overlying said flanges 113 and secured to said plate 111 by suitable means such as screws 115, sufficient clearance being provided to permit movement of slide or block 101 along said groove 112. Said plate 111 may be secured to table 105 by suitable means such as screws 116.

Mounted on said plate 111 is a guideway for the wire feeding device having arched sides 117 with outwardly extending base flanges which are secured to plate 111 by suitable fastening means such as screws 118 (Figs. 6, 7 and 8). Near the wire holding device 63 (Fig. 5) the sides 117 are connected by a cross member 119, and at the other end of the guideway member 49 of the wire-cleaning device is secured to said sides 117 by suitable means such as screws 120 (Fig. 11).

The wire-gripping means itself is supported on a plate or slide 125 slidable on the flat tops of guideway members 117. Said slide 125 has downwardly and outwardly beveled edges which fit under over-hanging beveled edges of members or guide strips 126 secured to said sides 117 by screws 127. At the left of Fig. 7, provision is made for adjustment by means of a set screw 128 and lock nut 129.

The central longitudinal part 130 of slide 125 is raised and near the forward end of the slide there are slots 131 at opposite sides of said part 130 and between said slots the part 130 is cut away in a transverse direction to provide a seat 132 for wire gripping members or plates 133 of which the upper parts have flat tops and sides perpendicular thereto and the base sections have square-cornered projections or ears 134. One ear 134 of each plate enters a recess 135 at the front side of said seat and the plates 133 are held in the seat by a member or bar 136 having a rib extending over the ears at the rear. Said member 136 may be held in place by any suitable means.

There are nine of said plates 133, thus providing means for gripping eight wires in separated relation. It should be noted that all of said plates 133 are provided at their wire-engaging positions with recesses 137 of such size that while gripping is effected with certainty the wires will not be deformed. All of the intermediate plates are flat but the end ones have inclined or cam outer faces and may be acted on by other cam members 138 to grip the wires 32.

Said cam members 138 are pivotally supported, by means of pins 139, in the sides 140 of a fork forming part of an irregularly shaped lever 142 (Fig. 1). Pivotal movement of cam members 138 is limited by shoulders 143. The sides 140 of the fork are fulcrummed on a pivot 144 at the front part of the slide 125. The sides 140 also extend downwardly and are connected together by a cross portion or member 145 of which the upper part is accommodated in a transverse recess in the bottom of the slide, thus economizing space in a vertical direction.

Below said cross portion 145 there is another fork comprising arms 141 which by means of a pivot pin 146 support a block 147 slidable in a vertical slot 148 in block or slide 151. Projecting rearwardly from said cross portion 145 is a finger 149 to limit the rearward and upward swing of said lever 142. As illustrated, this finger or member engages a set screw located in the bottom of slide 125. The rearward movement of the slide 125 is limited by a set screw 150 passing through member 49 and held in adjusted position by means of a lock nut 151. At the front edge of slide 125 there is a plate 152 to maintain the wires 32 at the proper level for gripping between the plates 133.

As shown in Fig. 12, the lower edge of the slide 125 is provided at its right end with a cam 153 to cooperate with the inclined surface or cam 154 on a spring plunger 155 and press the plunger back before the slide 125 begins its advance movement. The object of this arrangement is to make certain that the wires are gripped before the slide 125 advances. The spring plunger has a flatter return cam 156 on the opposite side of the plunger for engagement at the end of the return movement with a cam 157 at the opposite end of the slide or carriage and return of parts to their starting positions.

Said spring plunger is limited in its backward and forward movements by a fixed pin 158 projecting through a slot 159 in said plunger. The cylindrical rear end of the plunger fits in a tubular member 160 containing a helical spring 161. The inner end of said member 160 is screwed into the adjacent member 117, and the outer end of the spring is engaged by a screw threaded plug 162.

Another spring plunger device 163 is provided but its cams are arranged in an opposite manner. The reason for this change is that it is desirable to hold the slide 125 at the forward end of its stroke until the wires are released by device 62.

Obviously the wire advanced by the wire feeding device must be taken up and advanced by other means farther along in the machine. For example, at this time the welding apparatus is open and it is necessary to draw the newly completed bank strip out of the welding station. This may be done by engaging the rear end of the first bank strip beyond the welding station and advancing it to take up the slack which would otherwise result from the action of the wire feeding device 62.

To this end, the threaded rear end of a thrust rod 165 (see Figs. 2, 6 and 11) is threaded into the forward side of said block 101, and secured in adjusted position by a lock nut 166. Secured to the forward end of said rod 165 (see Fig. 2) is an upright bracket 167 carrying a pivot 168 by which is supported the forward end of a hook device 169 having two rearwardly extending branches with upwardly facing hooks 170 (see Figs. 2 and 13) positioned along the parts of the sides of the bank strips. This hook device 169 is urged upwardly by one or more spring-pressed pins 171 (Fig. 13) but has at its rear ends downwardly and rearwardly inclined cams 172.

With the parts in the positions indicated in Figs. 6, 11 and 13, forward movement of block or slide 101 will cause lever 142 to swing counterclockwise about its pivot 144 and cam blocks 138 will move downwardly and clamp the wires between the members 133. The clamping having been completed the wire feeding means will then move forwardly with the wires and the hooks 170 will engage the rear end of a completed bank strip near opposite edges thereof and advance it to substantially the same extent as the wires. Near the end of a forward stroke, the carriage will cam back the spring plunger device 163 and pass by the same.

As the wire advancing means 62 reaches the forward end of its stroke, the wire holding device 63 grips the wires to hold them against any return movement as the device starts back and throughout such rearward movement. There is a plate 177 mounted on said sides 117 and adjustably fixed in position thereon. Plates 164 correspond in number and general arrangement to plates 133 of device 62 and the end plates have the same general cam construction. Here, however, the cam movement is substantially horizontal as indicated in Fig. 10, and operating cams 179 are pivotally mounted on arms 180 of a yoke 181 with a tubular cross connection through which passes a pivot pin 182 supported in said sides 117.

The yoke formation provides an opening through which thrust rod 165 passes. Said yoke 181 forms part of a lever 183 extending downwardly and having at its lower end a roller 184 positioned for engagement by a face cam 185 against which it is pressed by a pin 186 urged forwardly by a spring 187. A hand-operated cam 188 may be used to release the holding means. Said face cam 185 has a high portion 189 and low portion 190 to control said lever 183.

The feeding of the longitudinal wires 32 and the completed bank strips 68 is advanced during one half of each revolution of the shaft 75 and during the remaining half of the revolution the wires are held against rearward movement and the feeding devices are returned to their starting or home positions. The positions of the parts at the end of the first half rotation of shaft 75 are indicated in Figs. 2, 5 and 6. At this time the wire feeding device 62 is in its rearward position and the plates 133 are unclamped thus leaving the wires 32 free at this device. Also the hooks 170 are in effective position at the rear of the first bank strip 68 beyond the welding station 65. Also the lever 183 is in position for release of the wire holding device 63.

Rotation of shaft 75 (Fig. 2) in the direction of the arrow (Fig. 2) will swing the lower end of lever 183 to the left and release the wires 32 at the wire holding device 63. The same movement of the shaft 75 will operate vertical shaft 92 and through eccentric pin 99 and pitman 100 will start forward movement of block 101. During the relative slow start by the eccentric connection, the elbow lever 142 on upper slide 125 will be swung counterclockwise (Fig. 11) to depress cam members 38 (Figs. 7 and 9) and grip the wires 32 between plates 133. Said slide 125 is held by spring plunger 155 until the wires are gripped by plates 133 and then the spring plunger is cammed back by slide 125 and the wires 32 are advanced. At the end of its forward movement slide 125 forces back a second spring plunger 163 similar to plunger 155 but with its end cams reversed in position. Plunger 163 snaps outwardly back of slide 125 and resists the rearward movement thereof to assure release of the wires at the beginning of the rearward movement, at which time the wires 32 are gripped by wire-holding device 63.

The advance of the slide 101 advances thrust rod 165 and bracket 167 on which hook lever 169 is pivoted. The hooks 170 on lever 169 engage the rear end of the first completed bank strip 68 at points in alignment with the side member of the bank strip frame. The hooks advance the completed bank strip and draw the next following completed bank strip out of the welding apparatus which is open at this time. At the same time another length of the group of wires 32 is drawn into the welding apparatus or station. The distance through which each completed bank strip is advanced is equal to the length of the bank strip body plus the length of the wires between two successive bank strip bodies.

As the wire gripping device starts rearwardly, lever 183 is released by the high portion 189 of cam 135 and the wires 32 are clamped in said wire-holding device 63. Also the hooks 170 start rearwardly and due to their inclined ends they ride under the side members of the frame of the next bank strip until the end is reached whereupon the hooks snap up at the rear end of the bank strip ready to advance the same. The hooked lever 169 may conveniently be made with two rearwardly extending arms mounted on said pin 171 and connected at the forward side of the pin by a cross portion serving to space said arms and adapted to engage a fixed member and limit the upward movement of the hooks.

From the wire holding device 63 the wires 32 pass through the welding apparatus 65 and the string of completed bank strips 68 beyond the welding station passes in succession through the weld testing station 69, the wire forming station 70 and the cut off station 71. Between these stations, the bank strips 68 are supported and guided by parallel guide members 200, the ends of the selector pins 66 resting on the tops of said members 200 to support said bank strips and the parts of the bank strip bodies beneath the pins being guided between said members 200.

A selector pin strip 67 of which the pins 66 are to be welded to multiplying wires 32 is placed, in a nest 201 of a welding ram 202 guided for vertical movement on guide posts 203. The lower ends of said guide posts are rigidly supported on a heavy base 204 which in turn is rigidly connected to said table 105. Each selector pin strip 67 is provided with similar outlines at three corners and a different outline at the remaining corner which is the upper left in Fig. 21. This formation which is disclosed in said W. F. Smith application Ser. No. 721,977, filed January 14, 1947, is utilized here to obtain correct positioning of the strip 67 in the nest 201 which has corners of complementary shape. The strip when thus positioned has at its top longitudinal grooves in the top of the central panel and extension thereof in higher end portion 205. The ram also has a comb 206 (Figs. 20 through 24) which projects through a central transverse slot 207 of said strip 67.

As clearly shown in Fig. 21, the crossing points of pins 66 and wires 32 are arranged in four inclined rows, each offset centrally of the strip. Beneath each of these crossing positions is a cylindrical lower electrode 208 mounted in a bore in a block 209 of conducting material forming part of the ram. In the upper end of each of said electrodes 208 is a shallow groove to receive a part of a selector pin 66. Projecting downwardly from the ram 202 is a plunger 210 connected at its lower end to a piston (not shown) in a cylinder 211.

In normal stopped condition, the one-revolution clutch 76 is held out of action by pawl 212 (Fig. 18) engaging shoulder 213 of the clutch. The welding ram 202 is down, and the wire-feeding device 62 is at the end of its path next to the wire holding device 63. If the machine is to be used, the motor 86 is started by pressing the master starter button 214 on the panel at the left of Fig. 2.

Upon pressing the operation-repeat button 214 at the welding station 69, fluid such as compressed air is admitted to the bottom of cylinder 211 and the ram is lifted to its Fig. 22 position with the wires 32 in the longitudinal grooves of the body of strip 67. Also at this time the strip frame is pressed against the lower side of a top frame 216 around an opening 217. Said top frame 216 is secured on the upper ends of said guide posts 203.

Figure 18:
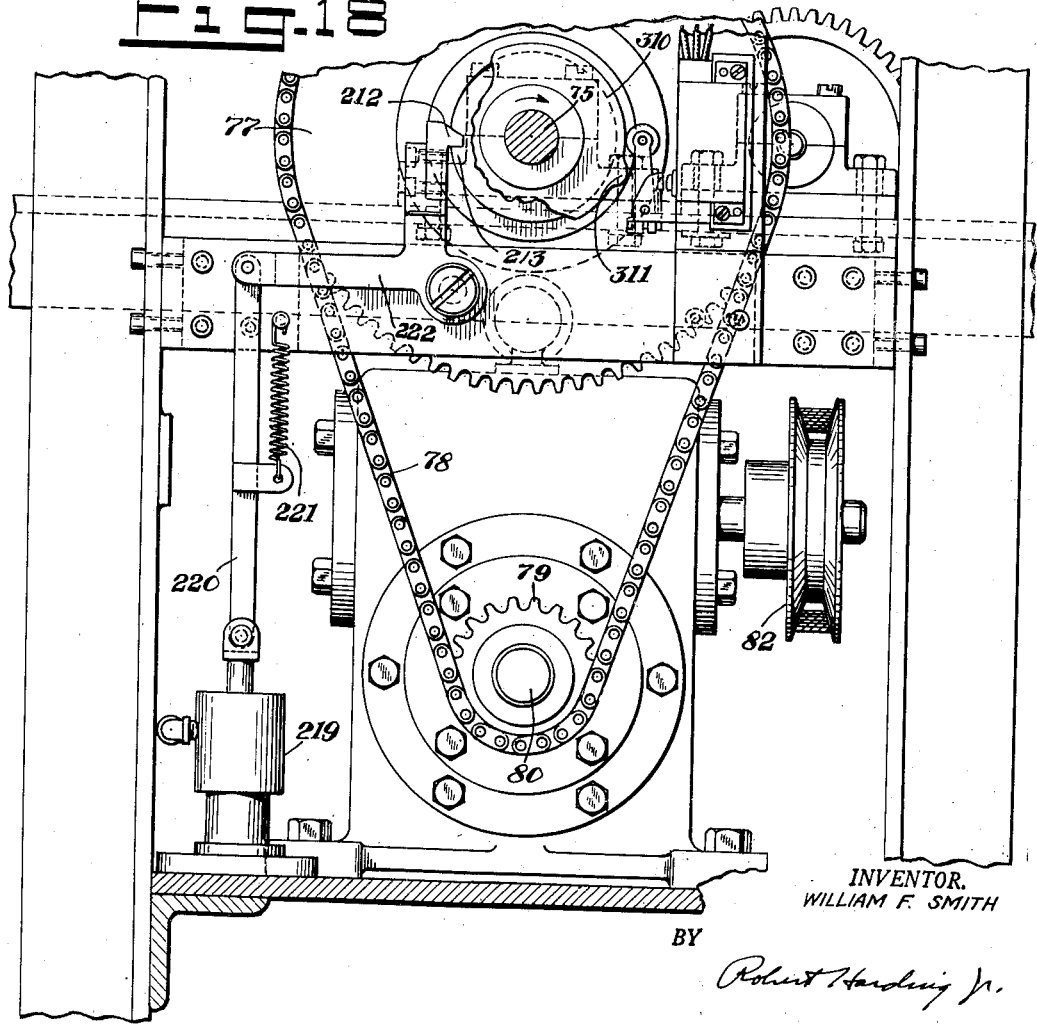
Fig. 18 is a fragmentary elevation illustrating the drive for the main shaft and the one revolution clutch.

As the ram reaches its uppermost position, it effects the operation of a micro-switch 218 (Figs. 2 and 13) which causes compressed air to be supplied to the upper part of cylinder 219 resulting in the downward movement of link 220 against the resistance of spring 221. The link 220 rocks bellcrank 222 carrying pawl 212 and releases shoulder 213 thus rendering one-revolution clutch 76 effective to turn shaft 75 in clockwise direction (Fig. 18). This gives an interval of one-half revolution of shaft 75 in which to carry out the welding operation.

To cooperate with the lower electrodes 208, there are eight upper electrodes 225. Alternate electrodes 225 are offset in a fore-and-aft direction and are grouped in pairs. For example, the first two at the left would be arranged as indicated diagrammatically in Fig. 21, that is the left hand electrode 225 would be in position to weld the fourth wire 32 from the top to the fourth pin 66 from the left and the next electrode would be in position to weld the eight wire from the top to the eight pin from the left. The arrangement is the same for the other pairs of electrodes 225.

Said electrodes 225 are adjustably mounted in the forward ends of levers 226 (Figs. 14 and 16) pivotally mounted and suitably spaced on a pivotal support secured at its ends to brackets 227 and 228 extending forwardly from a plate or carriage 229. The pivotal axis about which said levers 226 swing is parallel to the path of travel of the wires 32. Said carriage is mounted to travel in a path parallel to the inclined lines of four crossings so that by four one-step movements the electrodes 225 can be brought to all welding positions.

The rearward arms of all of the levers 226 are of equal length and carry rollers 230 mounted on inclined pivots 231 parallel to the path of movement of carriage 229. To urge the forward arms downwardly to operation position, the rear ends of the levers are provided with downwardly acting spring-pressed pins 232 to engage fixed parts of the machine.

All of the levers 226 carrying the upper electrodes 225 may be operated simultaneously to lift said electrodes by an elongated round member 233 overlying said rollers 230 and mounted in the forward ends of levers 234. Said levers 234 are pivoted at 235 intermediate their ends on brackets 236 fixed on table 105. At their rear ends levers 234 carry rollers 237 resting on cams 238. Cams 238 are fixed on shaft 239 and when the shaft is at rest the upper electrodes 225 are in raised position. Also at this time the carriage or plate 229 is at the right end of its path, as viewed in Figs. 4 and 14.

The travel of the carriage 229 may be controlled by a cam 240 fixed on shaft 239 and having a rim 241 running between the edges of two disk rollers 242 pivotally mounted on carriage 229. The cam edges of rim 241 are shaped to cause said carriage to travel step-by-step and to cause each upper electrode 225 to travel over four crossings and then return to normal position.

In order to provide power for passage of electricity between the upper electrodes 225 and the lower electrodes 208, a suitable power unit 245 (Fig. 4) is placed back of the welding station. Said unit 245 is connected to the electrodes 225 by individual insulated conductors 246, and to said block 209 carrying the lower electrodes 208 by means of a flexible conducting device 247 covered by insulation and a resilient conductor 248 attached at one end to device 247 and at the other end to said block 209. The flexible conducting device is required to accommodate the up and down movements of block 209.

Also mounted on shaft 239 outside of brackets 236 are cams 250 having four longitudinal ribs 251, each cam 250 operating four micro-switches 252 four times during a revolution of shaft 239 to cause welding of the wires 32 and pins 66 at the crossings under the electrodes 225 which are down at that time.

Figure 19:
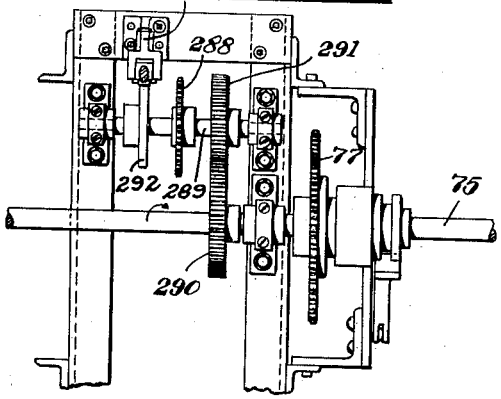
Fig. 19 is a top plan view of the structure shown in Fig. 18, parts being omitted.

The shaft 239 turns in the direction of the arrow (Fig. 14), or in the direction opposite to that of shaft 75. At the right end of Fig. 14 is shown a one-revolution clutch 255 to connect to shaft 239 a sprocket wheel 286 (Fig. 16) driven by a sprocket chain 287 from a sprocket wheel 288 on a shaft 289 behind shaft 75 in Fig. 2. Mounted on shaft 75 is a gear 290 which meshes with an equivalent gear 291 on said shaft 289. Back of gear 291 is the sprocket wheel 288 and farther back as shown also in Fig. 19, that is to the left in Fig. 2 is a cam 292 having a single projection 293 to engage a roller on the lower end of a centrally pivoted lever 294 (also shown in Fig. 16) connected at its top to one end of a link 295 which is pivoted at its other end to the lower end of pivoted clutch-release lever 296. Said lever 296 has at its upper end a tooth 297 engaging a shoulder 298 on a controlling part of one-revolution clutch 255. In this connection it should be noted that sprocket wheel 288 is twice as great in diameter as sprocket wheel 286 and that a full revolution of sprocket wheel 286 and shaft 239 occurs during the first half of each revolution of shaft 289 or shaft 75 when the latter is connected to sprocket wheel 77 by withdrawal of panel 212 from shoulder 213 (Fig. 18).

In addition to the welding operation just described, the wires 32 are secured in the raised end portions 205 of the bank strip body which is of suitable thermoplastic material such as polystyrene. As the welding ram 202 approached the upper limit of its movement prior to the welding operation, the upper ends of spring pressed pins 299 mounted on the ram (Figs. 13 and 23) engaged the outer ends of heater supports 300 mounted on pivots 301 and tilt the supports to bring heating elements 302 carried by said supports into contact with said parts 205 of the bank-strip body and cause the material to be softened and to flow down into the deep notches at those points and enclose the wires 32 as indicated in Figs. 26, 27 and 28. The heating of the heating elements is effected by power supplied through insulated electric cords 303.

Figure 17:
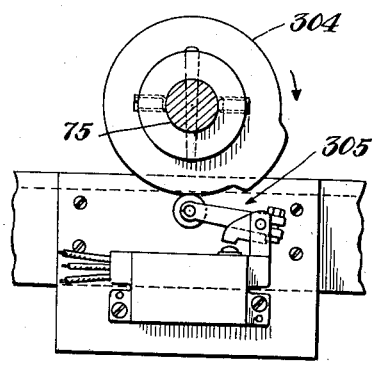
Fig. 17 is a fragmentary view partly in section, showing switch-operating means to control part of the welding apparatus.

At the end of a welding operation a cam 304 (Figs. 2 and 17) operates a micro-switch 305 to cause admission of air at the top of cylinder 211 and release at the bottom of the cylinder to produce positive lowering of the welding ram 202. The heater supports are then swung upwardly by means such as springs 306 (Fig. 23).

At this time, the bank strip 68 resulting from the last welding operation will be suspended by wires 32 as indicated in Fig. 13. The second stage of operation, that is the second half of a one revolution movement will then take place. Said second stage involves the forward feed of the wires 32 by the device 62 to draw wire off the reels and an advance movement of the bank strip just beyond the welding station, thus drawing wire 32 through the welding apparatus and advancing other bank strips at the right (Fig. 2) by utilizing the stiffness of the wires between successive bank strips.

As the shaft 75 approaches the end of a one-revolution movement, a cam 310 on shaft 75 (Fig. 18) will, through a single projection 311 thereon, operate a micro-switch 312 and cause compressed air to enter the lower end of a cylinder 313 (Figs. 2 and 29) and lift a piston (not shown) which acts through a rod or plunger 314 to lift a test ram 315. The lifting force is applied at the center of the ram and the guiding of the ram is effected at its ends, where vertical pins 316 project downwardly from the ram into bearings in guide bores 317 in projecting parts 318 of the main frame 319 of the weld-testing unit. The strip 68 to be tested is located just beneath the top 320 of the frame with the sides of the bank strip frame beneath two parallel sides 321 of said top, the pins 66 being supported on the upper edges of two bars 322 and 323 of insulating material.

Said ram includes a heavy base plate 324, a second plate 325 immediately above the base plate and secured thereto, and an upper plate 326 through which project the upper ends of members or pins 327. When the ram is in its lowermost position the plate 324 rests on the top of the parts 318 containing the guide bores 317.

Pins 327 are of insulating material and comprise cylindrical parts on shanks 328 fitting in bores in said plate 326 and heads 329 which normally rest against the tops of recesses at the lower side of said plate 326 due to upward pressure by springs 330 which are held in corresponding cylindrical bores in the plate 325. At their upper ends said pins 327 are reduced in diameter and are provided at their upper ends with grooves 331 adapted to receive pins 66 of a bank strip 68 under test. When said ram is raised each of said grooves receives one of the pins 66 and the parts at the sides of the groove extend upwardly into contact with the wires 32 which were welded to the pins 66. It is necessary to obtain very careful longitudinal adjustment of each bank strip 68 with reference to the test ram 315. As illustrated in Figs. 35, 36 and 37, this may be attained by use of upright posts 331a with inclined surfaces 331b projecting upwardly from the ram to cam each bank strip into proper position against the straight portions of these posts. In order to use said posts 331a in this way it is necessary to provide recesses in the frame top 320 to accommodate the upper ends of said posts when the ram is up.

If the welds are secure the pins 327 will be held down against the action of the supporting springs 33D as indicated at the right of the group of pins in Figure 36. If a wire 32 is not securely welded to the corresponding pin 66, the corresponding pin 327 will lift the wire from the pin. It is the object of this testing device to indicate such weld failures so that indications may be placed on the corresponding pins and such defects may be remedied later. Burning of material at the welds may be avoided by adjusting electrode pressure, voltage and length of time of power applications.

At one side of the main frame 319 is a slide 332 carrying jacks 333 corresponding in number and spacing to the pins 66. To operate slide 332 provision is made of a crank 334 mounted on a centrally located pivot 335 and having a generally vertical centrally-located arm 336 with a slot 337 receiving a pin 338 pivoted in a bracket 339 projecting downwardly from said slide 332 midway of the ends thereof. Said crank 334 also includes a generally horizontal arm 340 offset to one side to avoid the ram, and extending to the front of the main frame 319. The forward end of said arm 340 is connected by suitable means such as a flexible member 341 to a treadle 340.

When said ram is down, depression of the treadle 342 is prevented by means of a pin 343 secured in the base plate 324 of the ram, and positioned to engage a block or stop 344 at the front side of the upright arm 336 of said crank 334. When however, the ram is lifted as shown in Figure 33, the pin 343 will be above said block 344 and the treadle can be depressed to move the slide 332 to the left (Fig. 33) so that the jacks 333 will embrace the adjacent ends of pins 66. This brings the pins 66 into electrical connection with relays 345 which serve to light lamps 346 corresponding to the weld points of wires 32 and pins 66. The arrangement of such lamps in the testing device is shown on Fig. 29. The electric circuits including jacks 333 and pins 66 is completed through wires 32 wherever the welds make good electrical connections. However, if a wire 32 is separated from the corresponding pin 66 as indicated for the right hand pin in Fig. 37, the corresponding lamp will fail to light thus indicating a defective weld. The corresponding pin 66 may be marked in some way so that when the bank strip is taken out of the machine the weld can be repaired.

As shown in Figs. 31 and 33, the lamps 346 and the relays 345 are in a casing 347 having a base or shelf 348 reinforced by a downwardly extending flange 349 and one or more braces 350. Upward movement of the crank arm 340 is limited by engagement of the upright arm 336 with the forward end of a member 349a mounted in the flange 349 in position to be engaged by the upright arm of the bell crank. The stopping of forward movement of the slide 332 is cushioned by means including a spring 352. The arrangement of the relays, lamps and electrical connections in the casing 347 is indicated in dotted lines in Fig. 30.

To check proper functioning of relays 345 and lamps 346 during a weld test, test lamp button 355 should be pressed both before and after a weld test, since a lamp burn-out or relay failure is not ascertainable during the actual testing of the welds which is effected by pressing a test weld button 356. The welding station cannot operate while the testing ram is up and if the repeat button has already been pressed, it will not start any operations until the test ram has been lowered by release of the treadle or pedal 342. A micro-switch 357 is operated by a rod 351 slidably mounted in the flange 349 and engaged by the arm 346. This switch is arranged so that it is operated when the test ram 315 is in raised position to render a floor type switch 358 effective to operate the cut-off mechanism.

From the weld testing station 69 the bank strips 68 pass along the guides 290 to the wire forming or bending device 70 which comprises a frame 360 interposed in a gap in the guides 290 which, however, support the bank strips as they pass through the wire forming station. Said frame 360 has at its top parallel guides 361 overlying the sides of the bank strip frames and recessed at their lower faces to receive the sides of a bank strip frame with the side walls of the recesses serving as guides in connection with the ends of the terminal pins 66.

Vertically slidable in said frame 360 is a slide 362 limited as to its upward and downward movement by a fixed pin 362a, passing through a vertical slot 363 in slide 362. Above the upper end of slot 363 is a vertical bore 364 containing a tubular part 365 closed at the top by a member 366 and containing a hellical compression spring 366a which engages the bottom of bore 364. Said member 366 has a transverse guideway with sides overhanging the edges of a complementary-shaped wire-shifting slide 367. This secondary slide has projecting from its upper face eight pins 368 spaced to pass through the spaces between the eight wires 32 when raised to the proper level. A roller 369 is mounted on each end of slide 367 and when the slide 362 is down, one of these rollers engages a vertical surface 370 just beneath an outwardly inclined cam surface 371 and the roller 369 at the other end of slide 367 engages an outwardly inclined inner surface or cam 372 of a member or block 373 adjustably attached to said slide 367.

Figure 42:
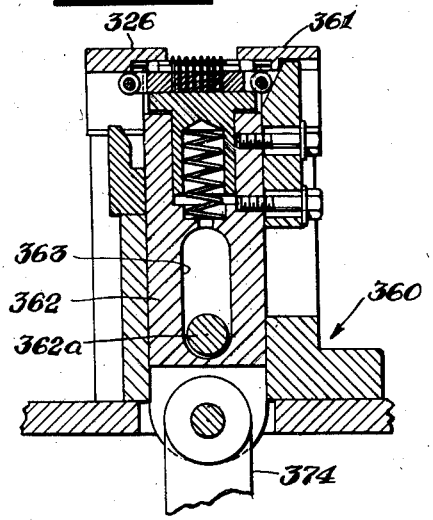
Fig. 42 is a view similar to Fig. 41 but showing the parts in the places assumed at the end of the second or wire-bending stage.
Figure 44:
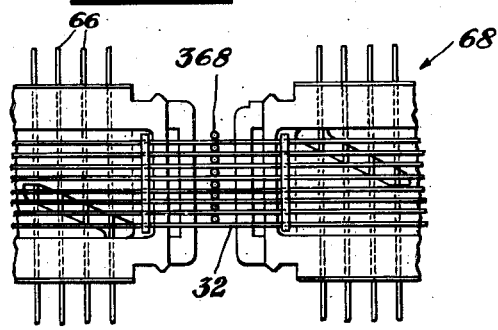
Fig. 44 is a fragmentary top plan view of adjacent ends of two successive strips with the connecting wires straight and the wire bending pins projecting above the longitudinal wires as indicated in Fig. 41.
Figure 45:
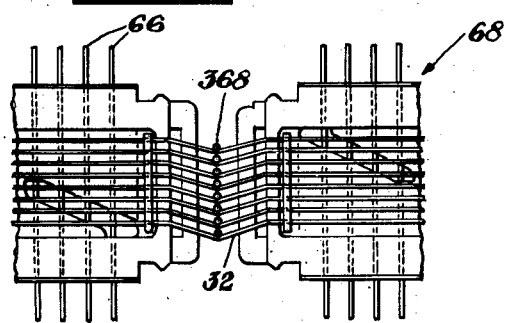
Fig. 45 is a top plan view similar to Fig. 44 but with the connecting wires bent as indicated in Fig. 42.
Figure 47:
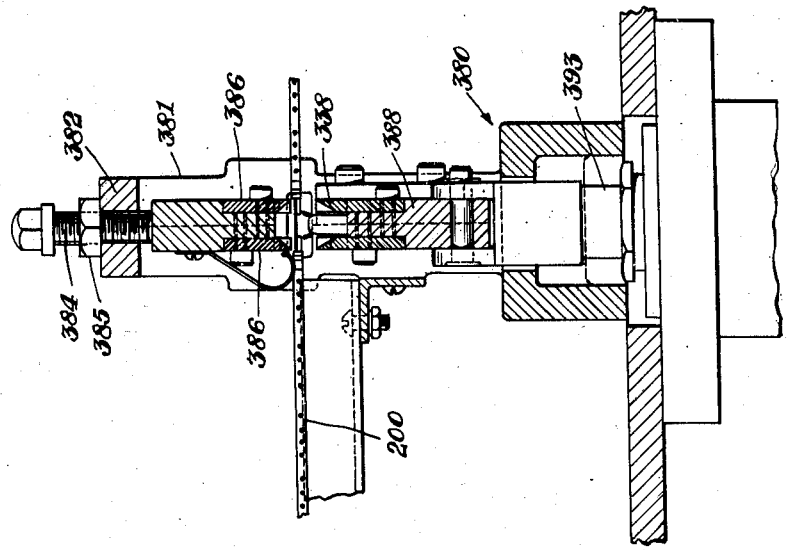
Fig. 47 is a section taken on the line 47—47 of Fig. 46.
Figure 46:
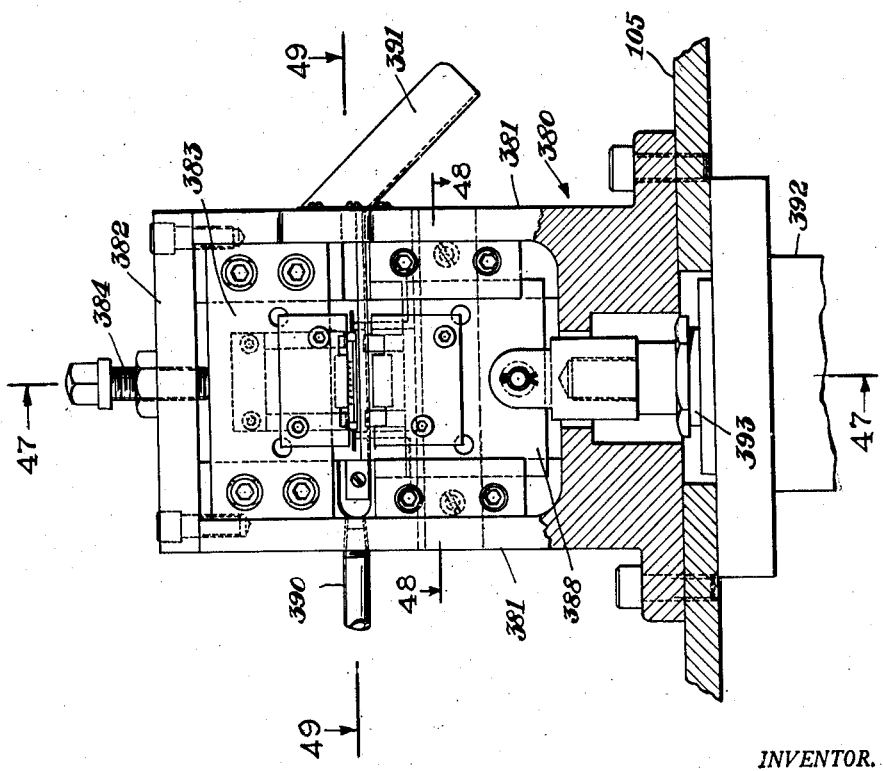
Fig. 46 is an end view of the cut-off mechanism, partly broken away.

Pivoted at the lower end of said slide 367 is the upper end of a link 374 connected at its lower end to an eccentric 375 on said shaft 75. Rotational movement of said eccentric 375 lifts slide 362 until the eight pins 368 pass upwardly between the wires 32 with one pin at one side of the group of wires 32. At this stage (Fig. 41) there has been no shifting of secondary slide 367 on slide 362. However, further upward movement of slide 362 will move slide 367 into engagement with the top of the frame and cause compression of spring 366a and upward movement of cam 372 will force the secondary slide 367 to the left (Fig. 42) and bend the straight portions of wires 32 (Fig. 44) between the bank strips 68 into the form shown in Fig. 45.

Figure 43:
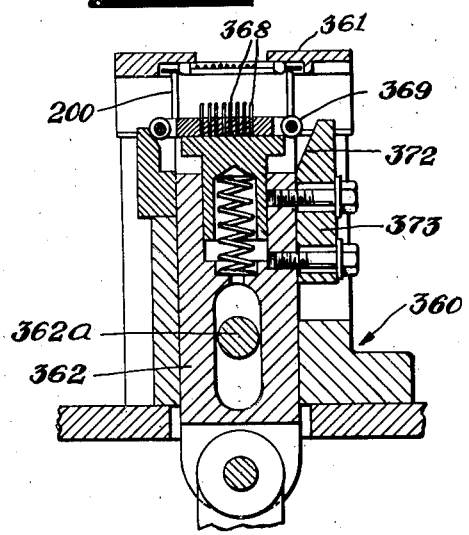
Fig. 43 is a view similar to Fig. 42 but showing the parts in the positions assumed at the end of the third stage in which the wire bending pins have been withdrawn from the wires but are still in sidewise-displaced positions.

When the slide 362 moves down, the position thereon of secondary slide 367 will not change until the left hand roller 369 (Fig. 43) engages cam surface 371, whereupon the secondary slide 367 will be restored to its normal position (Fig. 40).

From the wire-forming station 70, the string of bank strips 68 passes to a cut-off station 71, where one or a string of bank strips may be cut off. A strong frame 380 is mounted on table 105 across the path of the bank strips and two uprights 381 at opposite sides of the string of bank strips are connected at their upper ends by a heavy cross member or top 382. Beneath said top is a cutting-blade carrier 383 or cross member set on edge and engaged from above by a screw 384 threaded through said member 382 and held in adjusted position by a lock nut 385.

Cutting blades 386 with beveled lower edges are secured in recesses at opposite sides of said blade carrier or bar 383 with their cutting edges at the outside. These blades 386 have edges of such length that they can enter slots 387 in the adjacent ends of bank strips 68 (Figs. 51 and 53).

Below the string of bank strips is a cross head 388 having upwardly facing blades 388 arranged similarly to blades 386. In addition to these blades 388, said cross head is provided at opposite sides of the string of bank strips with upward projections 389 having tapered upper ends for properly positioning the bank strips with reference to the cutting blades.

As clearly indicated in Figs. 50 through 53 said projections 389 will upon upward movement of the cross head enter the space between the ends of the bank strips and separate them to the extent of straightening the wires 32 between them. The blades 388 will then enter said slots 387 and lift the wires 32 into engagement with the edges of the upper blades. This will result in cutting off between adjacent ends of two bank strips short lengths of wire. By means of an air jet supplied through tube 390, these short lengths of wire will be blown into an outlet chute 391 and discharged from the mechanism.

Spring fingers 392 are attached to bar or blade carrier 33 above the blade 386 at the entrance side of the carrier and after extending rearwardly and downward curve around to the front to rest on the end of a bank strip. During the cut-off operation these fingers yield as the ends of the bank strips 68 are, and as the cross head 388 moves down the springs fingers force the left hand bank strip down below the edge of the adjacent blade 38 to avoid blocking of the leading end of the next band strip to pass through the cut-off device.

The up and down movements of the cross head 388 may be effected by air under pressure acting on a piston (not shown) in a cylinder 392 and connected by means including a plunger 393 with said cross-head. To operate said plunger 393, the operator steps on electric switch 358 but this action will produce no result unless the test ram 315 is in raised position, thus assuring operation of the cut-off when the string of bank strips is stationary.

Power for operating the various parts is provided from the rear of the machine. For example, the electric power for the welding station is power unit 245 at the back of the machine. Said unit contains selenium rectifiers, transformer and other suitable equipment.

To use the machine the main power switch is closed. In this way power is supplied to all electrical apparatus. The next step is to depress starter button 214 to start motor 86 and to supply current to various relay circuits. The normal position of parts is the stopped position for loading, testing and cut-off operations, the test ram being in uppermost position when there is air in the lines.

A bank strip 68 is loaded into the welding unit and operation repeat button 215 is pressed. This will not start the machine unless the test ram has been lowered. Lowering of the test ram may be effected by depressing and then releasing the treadle 342. Then by means of a suitable relay the upside solenoid of "Hannifin" valve 400 will be energized to raise the welding ram to welding position. This relay is a locking relay in order that operation repeat button will not have to be held down until test unit slide returns to out position. The locking relay will be released before the machine has completed a cycle. When the welding ram reaches welding position, micro-switch 218 (Fig. 15) is closed and the one revolution cycle of shaft 75 starts. At an instant prior to the stopping of the main shaft at the end of a cycle, micro-switch 312 is tripped and causes four way solenoid valve 401 of the "Hannifin" type to operate to cause an "up" movement of the test ram and to render foot switch 358 effective to operate the cut-off mechanism 71 through the four way solenoid valve 402.

The test ram may be lowered by merely depressing and releasing treadle 342. However, for testing purposes, the treadle 342 is depressed when the test slide is back of test position. The lamp test button 355 is pressed to test the lights, the weld test button 356 is then pressed and pins 86 corresponding to defective welds are marked to facilitate later repair, and the lamp test button is again pressed. Upon release of treadle 342 the test ram will move to its "down" position.

It should be understood that various changes may be made and that certain features may be used without others, without departing from the true spirit and scope of the invention.

What is claimed is:

1. Apparatus for welding longitudinal wires to transverse selector pins in successive insulating bank strip bodies with successive crossover points between said wires and pins disposed in paths extending diagonally with respect to the length of said wires, comprising means for feeding parallel multiplying wires by steps at least as great as the length of a bank strip body, and welding means through which said wires are fed for welding said wires to pins of successive bank strip bodies at selected crossings during dwell intervals of the wire feed, said welding means including welding electrodes arranged in a plurality of sets spaced along the length of said wires, and means to move said electrodes as a unit in a step-by-step movement along said diagonal paths to register successively with said crossover points.

2. The combination according to claim 1 wherein each bank strip is supported beneath said longitudinal wires, means being provided to move said bank strip into engagement with said wires, the last-mentioned means including a welding ram with electrodes on which pins at selected crossings of said pins and wires are supported, upper electrodes disposed above said wires at selected crossings, and means for withdrawing said electrodes away from said crossings in timed relation to said feeding means.

3. The combination according to claim 1 wherein there are lower welding electrodes for all of the selected crossings, and a smaller number of upper electrodes spaced apart at greater intervals to avoid welding at closely adjacent points, and means for shifting said upper electrodes from one set of selected crossings to another until welding has been finished at all selected crossings.

4. The combination according to claim 1 wherein the wire-feeding means includes a stationary wire-holding device at the entrance of the welding means, a reciprocable wire-feeding device comprising wire-gripping means, means to release the wires from the wire-feeding means at the end of the advance stroke, and means to render said wire holding means effective at this time and during the return movement of the wire-feeding device and concomitant operation of the welding means.

5. The combination according to claim 1 wherein the wire-feeding means includes at the discharge side of the welding means a reciprocable device comprising a hook element pivoted at its forward end and having a hooked rear end spring-urged into position to engage the rear end of a previously finished bank strip and not only advance it but draw the next finished strip from the welding means, said hooked end having a cam formation at the hooked rear end to cam the hooked rear end down to pass under the following bank strip, and snap up back of the rear end thereof.

6. The combination according to claim 1 including at the entrance of the welding means a wire clamp device comprising a plurality of plates between which the wire passes and means for clamping said plates just before a welding operation starts and releasing them upon completion of said welding operation.

7. The combination according to claim 1 wherein the wire feeding means comprises a wire gripping device reciprocable to and from the entrance of said welding means and having an operating member, and a reciprocable operating device connected to said operating member whereby forward movement of said operating device will first render said gripping device effective and then advance it with the wires, and rearward movement will release said gripping device and then move it rearwardly.

8. The combination according to claim 1 wherein the wire feeding means comprises a wire gripping device reciprocable to and from the entrance of said welding means and having an operating member, a reciprocable operating device connected to said operating member whereby forward movement of said operating device will first render said gripping device effective and then advance it with the wires and rearward movement will release said gripping device and then move it rearwardly, and means for yieldably restraining said gripping device at both ends of its path to assure gripping at one end and release at the other.

9. Apparatus for making selector strips wherein parallel longitudinal wires are welded to transverse conductors with the conductors arranged in spaced groups extending transversely to said wires, comprising means for feeding said longitudinal wires step by step, and welding means including a vertically movable welding ram having spring-pressed electrodes and a nest into which fits one of said selector strips with said transverse conductors engaging said electrodes and exposed through insulation at the opposite face at selected points located on a diagonal path with respect to said wires, means to lift said ram to engage said strip with said wires, upper electrodes above said wires, means to move said upper electrodes against said wires at said selected points and then retract the same, and means for producing welding currents through said wires and conductors at said selected points when the upper electrodes are down.

10. Apparatus for making selector strips wherein parallel wires are welded to transverse conductors with the conductors arranged in spaced groups transverse to said wires, comprising means for feeding said longitudinal wires step by step, and welding means including a vertically movable welding ram to raise a selector strip to engage said longitudinal wires, means to limit the upward movement of said ram, lower electrodes in said ram, upper electrodes, and means for controlling the operation of said upper electrodes including means for shifting said upper electrodes from home positions in directions diagonal to said longitudinal wires and means for returning said upper electrodes to home positions, means for raising and lowering said upper electrodes for each change in position, and means for passing welding currents through cooperating upper and lower electrodes at selected points located on said diagonal directions.

11. The combination according to claim 10 wherein said means for shifting said upper electrodes comprises a carriage movable in a direction inclined to said longitudinal wires.

12. The combination according to claim 10 wherein the upper electrodes are mounted in the forward ends of levers pivoted on a shaft parallel to said longitudinal wires and carried by a carriage movable in a path inclined to said longitudinal wires.

13. The combination according to claim 10 including levers with said upper electrodes mounted in their outer ends, a carriage movable in a path inclined to said longitudinal wires and on which said levers are pivotally mounted, means acting on said levers to urge the upper electrodes downwardly, and means including a cross element to engage the rear arms of said levers and lift said upper electrodes.

14. The combination according to claim 10 including a carriage movable in a path inclined to said longitudinal wires, levers pivotally mounted on said carriage and with said upper electrodes mounted in their outer ends, and cam means for moving said carriage step by step in one direction and then returning it to its home position.

15. The combination according to claim 10 including a carriage movable in a path inclined to said longitudinal wires, levers pivotally mounted on said carriage and with said upper electrodes mounted in their outer ends, and carriage-shifting means including two disk rollers mounted on parallel pivots on said carriage and a cam rotatable on an axis parallel to said longitudinal wires and having between said disk rollers a circumferential portion offset in steps to move the carriage step by step in one direction and a part to return said carriage to home position.

16. Apparatus for welding longitudinal wires to transverse selector pins in successive insulating bank strip bodies, comprising means including reciprocating devices for feeding said longitudinal wires at both sides of a welding position and holding said wires taut during both advance and dwell periods, and welding means including a ram to lift one of said bank strip bodies into engagement with said longitudinal wires, means to limit the upward movement of a bank strip body, upper electrodes above said wires, and means to lower said upper electrodes to effective position and lift the same, and means to supply welding current.

17. The combination according to claim 16 wherein the ram has a nest into which a bank strip body fits and a transverse comb to project through a transverse slot in the bank strip body and position the wires when the ram is lifted.

18. Apparatus for making bank strips wherein longitudinal wires are welded to transverse selector pins in selector strips, comprising means for feeding said longitudinal wires step by step, a stop device above said wires, a welding ram with lower electrodes to raise a selector strip against said longitudinal wires and said stop device, and welding means acting on said wires from above comprising a carriage guided in a path inclined to said wires, levers pivotally mounted on said carriage to swing about an axis parallel to said wires, upper electrodes on the front ends of said levers, means cooperating with said carriage to urge said levers to lower said upper electrodes, a one-revolution shaft to the rear of said carriage, means actuated by said shaft in a single revolution to shift said carriage step by step in one direction and return it to home position, means actuated by said shaft to lower and raise said upper electrodes at welding positions, and means actuated by said shaft for controlling the welding circuits through said lower and upper electrodes.

19. Apparatus for making bank strips wherein longitudinal wires are welded to transverse selector pins in selector strips, comprising means for feeding said longitudinal wires step-by-step and advancing a string of completed bank strips in the same manner, means including a welding ram for positioning a selector strip with said wires engaging the same from above, welding means including upper electrodes for welding the selected wires and pins a plurality at a time, a longitudinal main control shaft, a one-revolution clutch to drive said main control shaft, a driving connection whereby said main-control shaft reciprocates said wire feeding and bank strip advancing means in a forward work stroke and an idle return stroke, a secondary shaft driven from the first at twice the speed thereof through a second one-revolution clutch, and operating said welding means during the first half-rotation of said main control shaft, means to raise said ram, means operated as the ram reaches the top of its path to render the first clutch effective to rotate the main control shaft and move the wire feeding and bank strip advancing means rearwardly in an idle stroke, means to render the second one revolution clutch effective at the same time to operate said welding means during the first half rotation of the main control shaft, the wire-feeding movements being effected during the second half turn of the main control shaft.

20. Apparatus for welding to parallel transverse pins in a flat body of insulating material where they are exposed at one face and insulated at the other except at selected points, a set of longitudinal wires drawn from a source of supply: comprising welding means through which said wires extend, an upper frame with an opening above said wires, a welding ram to move said body against said wires and upper frame and having electrodes to engage the pins of said body upper electrodes over said wires, means to depress said electrodes against said wires at corresponding selected points and then raise the same, and means for passing welding currents through said upper electrodes, means to feed said wires in a step-by-step manner in the direction of their length, means to hold said wires in their fed position during said welding, and operating means effective to lift said ram with said body thereon to welding position and then in one cycle of operations effect welding, retract of feeding means, release of the holding means, advance of the feeding means, gripping by the holding means, and release from the feeding means.

21. Apparatus comprising in combination, means for feeding longitudinal wires step by step in the direction of their length, welding means for welding to said wires at selected points selector pins of selector pin strips inserted into said welding machine when said feeding means is at rest said strips extending transversely to said wires, means to advance said wires and bank strips thereon, a testing device receiving a welded bank strip at each forward feed of said wires comprising a test ram raised at the end of each feeding movement and having spring pressed insulating pins to engage said wires close to said pins and lift wires away from the pins at defective welds, indicating means including lamps corresponding to said welds which are lighted when said welds are sound, and means to operate said feeding means said welding means and said testing and indicating means in predetermined timed relation.

22. Apparatus comprising in combination, means for feeding longitudinal wires step by step in the direction of their length, means for welding to said wires at selected points selector pins of selector pin strips inserted into said welding machine when said feeding means is at rest with the strips extending transversely to said wires, means to advance said wires and bank strips thereon thus drawing fresh wire into said welding means, a testing device comprising a test ram raised at the end of each feeding movement and having spring pressed insulating pins with forked upper ends to straddle said selector pins and separate said wires from the pins at defective welds, indicating means including lamps corresponding to said welds which are lighted when said welds are sound, and means to operate said feeding means said welding means and said testing and indicating means in predetermined timed relation.

23. The combination according to claim 21 wherein said indicating means includes a set of contacts movable into and out of engagement with the pins of the bank strip being tested, means to prevent movement of said contacts into engagement with said pins except when said ram is raised, and means to prevent lowering of said ram unless said contacts are separated from said pins.

24. The combination according to claim 21 wherein said indicating means includes a set of jacks corresponding to the pins of the bank strip being tested, a slide on which said jacks are mounted, means urging said slide away from said pins, means for moving said slide toward said pins including an elbow lever pivoted beneath said slide and having an upright arm connected to said slide to operate the same and a forwardly projecting operating arm, a stop element on said lever between said arms and having a front face and a top, and a member extending rearwardly from said ram to cooperate with said front face of said stop element when the ram is down but located above and over said stop when the ram is raised.

25. The combination according to claim 24 wherein the wire forming device comprises pins projecting upwardly from a pin carrying member and means to raise said pins into engagement with said wires, shift the pin carrying member transversely of the wires, lower said member and restore it to its home position.

26. The combination according to claim 24 wherein the wire forming means includes a vertically reciprocable main slide beneath the wires connecting adjacent bank strips, a secondary slide carrying pins to be raised at one side of the corresponding wires, a member yieldably supported by said main slide and on which the secondary slide is mounted for movement transverse to said wires, and means for controlling said secondary slide including a stationary cam at one end and a cam on said main slide, both inclined outwardly and upwardly whereby upward movement of the main slide will move the secondary slide away from the stationary cam but with the cam on the main slide until the pins have passed to the proper sides of the wires and the secondary slide is stopped by the bank strip guides whereupon the cam on the main slide will go still higher and force the secondary slide to one side thus displacing the wires laterally, the secondary slide being restored to normal position by the stationary cam at the end of its downward movement.

27. Apparatus for making strings of bank strips in which longitudinal wires are connected by welds at selected points to transverse terminal pins in a bank strip body of insulating material having transverse slots at their ends, and secured to said body at the inner sides of said slots: comprising means for feeding said longitudinal wires into said apparatus and a string of completed bank strips therethrough, means for welding said wires to terminal pins of a bank strip body and securing said wires to said body at the inner sides of said slots, means for bending said wires between successive bank strips, means at a point at which bent wires are located when the string is at rest for positioning the bank strips to be cut apart with said wires straight therebetween and then cutting the wires at that location, and means for operating said feeding means said welding means and said bending means in predetermined timed relation.

WILLIAM F. SMITH.

REFERENCES CITED

The following references are of record in the file of this patent:

UNITED STATES PATENTS

| Number | Name | Date |
|---|---|---|
| 1,448,566 | Muller et al. | Mar. 13, 1923 |
| 1,635,536 | Butler | July 12, 1927 |
| 1,754,948 | Hatch | Apr. 15, 1930 |
| 2,100,502 | Campbell et al. | Mar. 30, 1937 |
| 2,268,815 | Funk | Jan. 6, 1942 |
| 2,286,945 | Andrews et al. | June 16, 1942 |
| 2,308,658 | Jendresen | Jan. 19, 1943 |
| 2,325,291 | Weightman | July 27, 1943 |
| 2,339,884 | Schlumpf | Jan. 25, 1944 |